United States Patent
Walker et al.

(10) Patent No.: US 8,536,284 B2
(45) Date of Patent: Sep. 17, 2013

(54) N,N'-DIMETHYL SECONDARY DIAMINE POLYMER AS EPOXY RESIN CURING AGENT

(75) Inventors: Frederick Herbert Walker, Allentown, PA (US); Michael Ian Cook, De Meern (NL); Gamini Ananda Vedage, Bethlehem, PA (US); Robert Marjo Theodoor Rasing, Didam (NL); Vipul P. Dholakia, Macungie, PA (US)

(73) Assignee: Air Products & Chemicals, Inc., Allentown, PA (US)

( * ) Notice: Subject to any disclaimer, the term of this patent is extended or adjusted under 35 U.S.C. 154(b) by 0 days.

(21) Appl. No.: 12/689,472

(22) Filed: Jan. 19, 2010

(65) Prior Publication Data

US 2010/0119838 A1    May 13, 2010

Related U.S. Application Data

(62) Division of application No. 11/584,388, filed on Oct. 20, 2006, now Pat. No. 7,666,954.

(51) Int. Cl.
| | |
|---|---|
| C08G 59/56 | (2006.01) |
| C08G 59/60 | (2006.01) |
| C08G 73/00 | (2006.01) |
| C08G 73/02 | (2006.01) |
| C08L 63/02 | (2006.01) |
| C08L 71/02 | (2006.01) |
| C08L 77/06 | (2006.01) |
| C09K 3/00 | (2006.01) |

(52) U.S. Cl.
USPC ...... 525/523; 252/182.13; 525/407; 525/423; 525/504; 525/526; 528/120; 528/422

(58) Field of Classification Search
None
See application file for complete search history.

(56) References Cited

U.S. PATENT DOCUMENTS

| 3,654,370 A | 4/1972 | Yeakey |
|---|---|---|
| 4,036,882 A | 7/1977 | Bertozzi et al. |
| 4,110,309 A | 8/1978 | Schulze et al. |
| 4,647,409 A * | 3/1987 | Groll et al. ............ 540/134 |
| 4,766,229 A * | 8/1988 | Kobayashi et al. ........ 556/138 |
| 4,886,867 A | 12/1989 | Lin et al. |
| 5,280,091 A | 1/1994 | Dubowik et al. |
| 5,382,606 A | 1/1995 | Butikofer |
| 5,426,157 A | 6/1995 | Starner et al. |
| 5,489,630 A | 2/1996 | Walker |
| 5,567,748 A | 10/1996 | Klein et al. |
| 5,618,905 A | 4/1997 | Marsella et al. |
| 5,688,905 A | 11/1997 | Walker |
| 6,962,964 B2 | 11/2005 | Ulman et al. |
| 2007/0122558 A1 | 5/2007 | Gibiat et al. |
| 2009/0259003 A1 | 10/2009 | Walker et al. |
| 2010/0048827 A1 | 2/2010 | Walker et al. |
| 2010/0048954 A1 | 2/2010 | Vedage et al. |

FOREIGN PATENT DOCUMENTS

| DE | 38 03 508 C2 | 4/1994 |
|---|---|---|
| EP | 0 369 752 A | 5/1990 |
| FR | 2863539 A1 | 6/2005 |
| GB | 858038 A | 1/1961 |
| JP | 53065399 | 6/1978 |
| JP | 54154500 | 12/1979 |
| JP | 2103221 A | 4/1990 |
| JP | 02255832 A | 10/1990 |
| JP | 06025391 | 2/1994 |
| JP | 08208810 | 8/1996 |
| JP | 2006274196 | 4/2008 |
| JP | 2009249633 | 10/2009 |
| KR | 2002-0052553 A | 7/2002 |

OTHER PUBLICATIONS

"The Jaffamine Polyetheramines" [Online]; www.huntsman.com/performance_products/Media>; 2007; XP0024663623.
Posey M., et al; "Spanning the Gulf Between Primary Amine and Hydroxyl Reactivity, New Secondary Aliphatic Amines for the Formulator's Toolbox"; PDA Annual conference [Online]; Mar. 10, 2005; www.huntsman.com/performance_products/Media/Se>; XP002463622.
Marsella, J. A., et al., "Acceleration of Amine/Epoxy Reactions with N-Methyl Secondary Amines," Journal of Polymer Science: Part A: Polymer Chemistry, vol. 38, pp. 921-930 (2000).
Williams, J. G., "The Beta Relaxation in Epoxy Resin-Based Networks," Journal of Applied Polymer Science, vol. 23, pp. 3433-3444 (1979).
Matejka, L., "Amine Cured Epoxide Networks: Formation, Structure, and Properties," Macromolecules, American Chemical Society, vol. 33, pp. 3611-3619 (2000).
Sandreczki, T. C., et al., "Electron Paramagnetic Resonance Studies of Amine-cured Epoxy Resins: Dependence of Nitroxide Spin-Probe Mobility on Cross-Link Density, Free Volume, and Temperature," Macromolecules, American Chemical Society, vol. 17, pp. 1789-1794 (1984).
Brown, I. M., et al., "Motional Correlation Times of Nitroxide Spin Labls and Spin Probes in an Amine-Cured Epoxy Resin: Solvent Dependence," Macromolecules, American Chemical Society, vol. 18, pp. 2702-2709 (1985).
Jean, Y. C., Positronium Annihilation in Amine-Cured Epoxy Polymers, Journal of Applied Polymer Science, vol. 24, pp. 1247-1258 (1986).
CAPLUS accession No. 2004:920247 for Korean Patent No. 2002-52553, Jun et al., Jul. 4, 2002, one page.

(Continued)

Primary Examiner — Robert Sellers
(74) Attorney, Agent, or Firm — Michael K. Boyer

(57) ABSTRACT

The present invention provides N,N'-dimethyl secondary diamine polymers including methylamine-terminated poly-(N-methylazetidine) and methylamine-terminated poly-(N-methylazacycloheptane). Amine compositions and amine-epoxy compositions comprising N,N'-dimethyl secondary diamine polymers are also disclosed.

21 Claims, No Drawings

(56) References Cited

OTHER PUBLICATIONS

Derwent accession No. 203-427541 for Korean Patent No. 2002-52553, Jun et al., Jul. 4, 2002, one page.
Wikipedia, definition of azetidine, 2009, one page.
Tanaka, Y.; "Synthesis and Characteristics of Epoxides"; C.A. May, ed.; Marcel Dekker; 1988.
Ashcroft, W.R.; "Curing Agents for Epoxy Resins" Chemistry and Technology of Epoxy Resins; 1993; pp. 14-15, 37-71.
Lee, H., et al; "Acid Curing Agents for Epoxy Resins"; Handbook of Epoxy Resins; 1967; pp. 11-1-11-29.
Cadogan, D.F., et al.; "Plasticizers"; Kirk-Othmer Encyclopedia of Chemical Technology; 1996; vol. 19; pp. 258-290.
"Epoxy Resins"; Kirk-Othmer Encyclopedia of Chemical Technology; vol. 10; pp. 347-471, 2005.

* cited by examiner

N,N'-DIMETHYL SECONDARY DIAMINE POLYMER AS EPOXY RESIN CURING AGENT

This application is a divisional application of U.S. patent application Ser. No. 11/584,388, filed on Oct. 20, 2006, now U.S. Pat. No. 7,666,954; the disclosure of which are incorporated herein by reference.

BACKGROUND OF THE INVENTION

The present invention relates generally to N,N'-dimethyl secondary diamine polymeric compounds, amine and amine-epoxy compositions employing such compounds, and methods of making epoxy resin compositions.

Epoxy resins which are cured, hardened, or crosslinked with multifunctional amines, i.e., amine compounds having three or more active amine hydrogens, are well known in the industry. These materials are widely used in applications such as coatings, adhesives, composites, and civil engineering applications such as formulations for flooring. In coating applications, amine-cured epoxy formulations generally can be cured at room temperature to yield films with high mechanical strength, good water, chemical, and corrosion resistance, and excellent adhesion properties, particularly to metallic substrates. Thus, they are often employed as primers and topcoats for large structures such as ships, bridges, and industrial plants and equipment.

Before regulations placing limits on the volatile organic compound (VOC) content of amine-epoxy coatings, formulations were often based on solid epoxy resins. These resins are solid at room temperature. Coatings using solid epoxy resins usually dried very quickly, since only solvent evaporation, not chemical cure, was required for the coating to reach a dry-to-touch state.

Due to the VOC regulations, epoxy resins that are liquids at room temperature have replaced solid epoxy resins in many applications. This transition has resulted in several problems, for example, in coating applications. Amine-epoxy compositions based upon liquid epoxy resins tend to cure much more slowly than a comparable solid epoxy resin formulation, and this problem becomes more severe at lower temperatures. Shipyards, for example, often reside in locations with cold winters, and paint must be applied when temperatures are about 5° C. or colder. Certain amine-epoxy coating formulations cure very slowly at these temperatures, often requiring at least 24 hours, and in some cases much more than 24 hours, to reach the "walk-on" dry state required so that painters can apply a second or third coat, if required. In the laboratory, the "walk-on" dry state is often estimated by the thumb-twist test method. Slow drying times can dramatically impact a shipyard's productivity. Thus, fast cure speed at below room temperature is a desirable property in many applications.

It is also beneficial to limit the volatility of the amine component in the amine-epoxy formulation. In addition to meeting VOC regulations, reducing volatility can reduce worker exposure and safety concerns.

Amine-epoxy coating formulations based on a liquid epoxy resin, as opposed to a solid epoxy resin, can also be less flexible than required for certain rigorous applications. For example, in ships employing modern double hull construction, the steel used in the two hulls that form the ballast tank is a thinner gauge than used in single hull ships. As a result of the thinner gauge, the steel flexes more which can lead to a stress crack failure of the coating, especially around welded joints. This in turn can lead to corrosion, which can be expensive to repair and can affect the ship's integrity. Further, in the rail car industry, there are also problems due to lack of coating flexibility at the weld seams. Additionally, coatings in many other applications require greater flexibility, for example, to achieve a desired impact resistance for a given application, or to post-form a metal after painting. In the end-use application, the amount of stress or deformation that the material undergoes, as well as the rate of deformation, are important factors for determining the flexibility required and thus the suitability of a particular amine-epoxy composition or formulation.

Many epoxy coatings are over-coated with a second or third coating. The additional coatings are not limited to epoxy-based systems and can include other chemical coating systems (e.g., polyurethanes) in order to provide particular end-use properties, such as corrosion resistance, weatherability, etc. Intercoat adhesion in formulations based on liquid epoxy resins typically is less than comparable solid epoxy resin formulations, often leading to intercoat adhesion failures. When adequate intercoat adhesion for a liquid epoxy system is obtained, re-coating often must occur within a limited time frame if intercoat adhesion failures are to be avoided. This time is often referred to as the re-coat window.

Many amine-epoxy coatings suffer from problems referred to in the industry as blush, carbamation, and exudate. These problems, in part, are due to the incompatibility of the amine curing agent and the epoxy resin, which causes phase separation and results in amine migration to the coating surface. In primary amines, the migratory amine can react with $CO_2$ present in the air, resulting in carbamation. Whether in the form of carbamation or the greasy surface layer referred to as exudate or blush, these surface defects detract from the appearance of the coating, and can lead to intercoat adhesion failures if the film is re-coated. These problems are generally worse for coatings applied and cured at colder temperatures, where amine-epoxy compatibility is reduced.

There are several broad classes of multifunctional amine curing agents that are employed in the amine-epoxy coating industry, including polyamides, phenalkamines, and amine adducts. None of these known products addresses the needs or solves the problems noted above. Accordingly, it is to this end that the present invention is directed.

BRIEF SUMMARY OF THE INVENTION

The present invention discloses novel N,N'-dimethyl secondary diamine polymers, and methods of making these new compounds. These polymers can have a number-average molecular weight ($M_n$) from about 140 to about 1000, and can be selected from a methylamine-terminated polyoxypropylene polymer, a methylamine-terminated polyoxypropylene polyoxyethylene copolymer, or a polymer having the following formula:

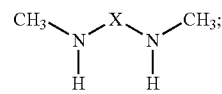

wherein X is a moiety having the formula:

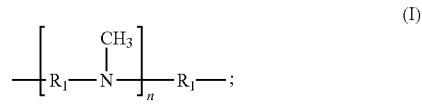

(I)

wherein:

R$_1$ is a C$_2$-C$_8$ linear or branched alkanediyl; and n comprises integers, the average of which is determined as a function of M$_n$.

In an aspect the invention provides a method for making an N,N'-dimethyl secondary diamine polymer having a number-average molecular weight (Mn) from about 140 to about 1000, the polymer having the following formula:

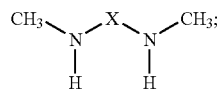

wherein X has the formula (I), as indicated above; R$_1$ and n are as defined above, which comprises (i) adding one of an appropriate nitrile and monomethylamine to the other in a reactor by delayed addition mode at about 40 to 80° C. in a nitrile to monomethylamine molar ratio of 0.6:1 to 2.2:1 to form an intermediate nitrile by the Michael addition reaction, and (ii) continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) a temperature from 70 to 150° C. and a hydrogenation catalyst at 0.75 to 5 wt % of the total intermediate nitrile feed.

In one aspect, the present invention provides an amine curing agent composition comprising:

(i) 90% to 10% by weight, based on total amine curing agent composition, of at least one N,N'-dimethyl secondary diamine polymer having a number-average molecular weight (M$_n$) from about 140 to about 1000; and (ii) 10% to 90% by weight, based on total amine curing agent composition, of at least one multifunctional amine having 3 or more active amine hydrogens.

Further, an amine-epoxy composition can comprise the contact product of the amine curing agent composition and an epoxy component comprising at least one multifunctional epoxy resin.

In another aspect, the present invention is directed to an amine-epoxy composition comprising the contact product of:

(a) an amine curing agent component comprising at least one N,N'-dimethyl secondary diamine polymer selected from a methylamine-terminated polyoxypropylene polymer, a methylamine-terminated polyoxypropylene polyoxyethylene copolymer, or a polymer having the formula:

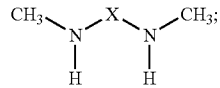

wherein X has the formula (I), as indicated above; R$_1$ and n are as defined above; and the at least one N,N'-dimethyl secondary diamine has a M$_n$ from about 140 to about 1000; and (b) an epoxy component comprising at least one multifunctional epoxy resin.

In another aspect, the present invention is directed to an amine-epoxy composition comprising the contact product of:

(a) an amine curing agent component comprising:

(i) 90% to 10% by weight, based on total amine curing agent component, of at least one N,N'-dimethyl secondary diamine polymer selected from a methylamine-terminated polyoxypropylene polymer, a methylamine-terminated polyoxypropylene polyoxyethylene copolymer, or a polymer having the formula:

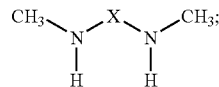

wherein X has the formula (I), as indicated above; R$_1$ and n are as defined above; and the at least one N,N'-dimethyl secondary diamine has a M$_n$ from about 140 to about 1000; and (ii) 10% to 90% by weight, based on total amine curing agent component, of at least one multifunctional amine having 3 or more active amine hydrogens; and (b) an epoxy component comprising at least one multifunctional epoxy resin.

In yet another aspect, an amine-epoxy composition is provided that comprises the contact product of an amine curing agent component and an epoxy component, the epoxy component comprising at least one multifunctional epoxy resin. In this aspect, the amine component comprises 90% to 10% by weight of methylamine-terminated poly-(N-methylazetidine) and 10% to 90% by weight of at least one multifunctional amine having 3 or more active amine hydrogens. The weight percentages are based on the total amine curing agent component.

The present invention also provides a method of making an epoxy resin composition comprising:

(a) forming an amine component comprising:

(i) 90% to 10% by weight, based on total amine component, of at least one N,N'-dimethyl secondary diamine polymer selected from a methylamine-terminated polyoxypropylene polymer, a methylamine-terminated polyoxypropylene polyoxyethylene copolymer, or a polymer having the formula:

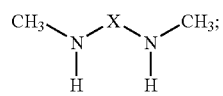

wherein X has the formula (I), as indicated above; R$_1$ and n are as defined above; and the at least one N,N'-dimethyl secondary diamine has a M$_n$ from about 140 to about 1000; and (ii) 10% to 90% by weight, based on total amine component, of at least one multifunctional amine having 3 or more active amine hydrogens; and (b) contacting the amine component with at least one multifunctional epoxy resin at a stoichiometric ratio of epoxy groups in the multifunctional epoxy resin to amine hydrogens in the amine component ranging from about 1.5:1 to about 1:1.5.

In another aspect, the present invention provides an amine curing agent composition which can be used to cure, harden, or crosslink an epoxy resin. This composition can comprise:

(i) 90% to 10% by weight, based on total amine curing agent composition, of at least one N,N'-dimethyl secondary diamine polymer selected from a methylamine-terminated polyoxypropylene polymer, a methylamine-terminated polyoxypropylene polyoxyethylene copolymer, or a polymer having the formula:

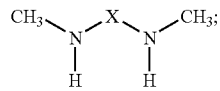

wherein X has the formula (I), as indicated above; $R_1$ and n are as defined above; and the at least one N,N'-dimethyl secondary diamine has a $M_n$ from about 140 to about 1000; and (ii) 10% to 90% by weight, based on total amine curing agent composition, of at least one multifunctional amine having 3 or more active amine hydrogens.

In yet another aspect, the present invention provides for an amine curing agent composition comprising:
(i) about 80% to about 20% by weight, based on total amine curing agent composition, of at least one N,N'-dimethyl secondary diamine selected from methylamine-terminated poly-(N-methylazetidine), methylamine-terminated poly-(N-methylazacycloheptane), or a combination thereof; and
(ii) about 20% to about 80% by weight, based on total amine curing agent composition, of at least one multifunctional amine having 6 or more carbon atoms and 3 or more active amine hydrogens.

Amine-epoxy compositions of the present invention can be used to produce coatings with improved "walk-on" dry times, rapid hardness development, good gloss and surface appearance, and/or outstanding impact resistance and flexibility as compared to conventional amine-epoxy coatings.

DEFINITIONS

The following definitions and abbreviations are provided in order to aid those skilled in the art in understanding the detailed description of the present invention.

| | |
|---|---|
| AHEW - | amine hydrogen equivalent weight. |
| A1618 - | Ancamine ® 1618, commercially available from Air Products and Chemicals, Inc., amine adduct derivative of a cycloaliphatic amine, AHEW = 115. |
| A2050 - | Ancamide ® 2050, commercially available from Air Products and Chemicals, Inc., polyamide adduct, ANEW = 150. |
| A2390 - | Ancamine ® 2390, commercially available from Air Products and Chemicals, Inc., a flexibilized, modified cycloaliphatic amine, ANEW = 204. |
| A2603 - | Ancamine ® 2603, commercially available from Air Products and Chemicals, Inc., aliphatic amine adduct, AHEW = 175. |
| A2609 - | Ancamine ® 2609, commercially available from Air Products and Chemicals, Inc., Mannich base derivative of an aliphatic amine, AHEW = 75. |
| A350A - | Ancamide ® 350A, commercially available from Air Products and Chemicals, Inc., polyamide, AHEW = 95. |
| BA - | benzyl alcohol, commercially available from Fisher Scientific UK Ltd. |
| CX-105 - | Sunmide ® CX-105, commercially available from Air Products and Chemicals, Inc., phenalkamine, AHEW = 142. |
| DGEBA - | diglycidyl ether of bisphenol-A. |
| EEW - | epoxy equivalent weight. |
| IPDA - | Isophorone diamine, commercially available from Degussa AG, AHEW 43. |
| K54 - | Ancamine ® K54, commercially available from Air Products and Chemicals, Inc., tris-dimethylaminomethyl phenol. |
| $M_n$ - | number-average molecular weight. |
| MPCA - | also abbreviated as MBPCAA. MPCA is a mixture of methylene bridged poly(cyclohexyl-aromatic)amines that fits within the class of multifunctional amines. Ancamine ® 2168, commercially available from Air Products and Chemicals, Inc., is a MPCA with an AHEW of 57 and is the grade utilized in the examples. |
| MXDA - | Meta-xylylenediamine, commercially available from Mitsubishi Chemical Corporation, AHEW = 34. |
| NC541LV - | Cardolite ® NC541LV, commercially available from Cardolite Corporation, low viscosity phenalkamine, ANEW = 125. |
| PACM - | Amicure ® PACM, commercially available from Air Products and Chemicals, Inc., 4,4'-diaminodicyclohexyl-methane, ANEW = 53. |
| PHR - | parts per hundred weight resin. |

DETAILED DESCRIPTION OF THE INVENTION

Amine and Epoxy-Amine Compositions

The present invention discloses novel N,N'-dimethyl secondary diamine polymers, and methods of making these new polymeric compounds. These polymers can have a $M_n$ from about 140 to about 1000. In another aspect of the present invention, such polymers can have a $M_n$ from about 160 to about 500. N,N'-dimethyl secondary diamine polymers in accordance with the present invention are selected from a methylamine-terminated polyoxypropylene polymer, a methylamine-terminated polyoxypropylene polyoxyethylene copolymer, or a polymer having the following formula:

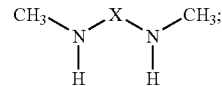

wherein X is a moiety having the formula:

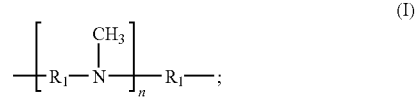

wherein:
$R_1$ is a $C_2$-$C_8$ linear or branched alkanediyl; and
n comprises integers, the average of which is determined as a function of $M_n$.

Additionally, an amine-epoxy composition can comprise the contact product of the N,N'-dimethyl secondary diamine polymer and an epoxy component comprising at least one multifunctional epoxy resin.

In another aspect, the present invention provides an amine-epoxy composition comprising the contact product of:
(a) an amine curing agent component comprising:
  (i) 90% to 10% by weight, based on total amine curing agent component, of at least one N,N'-dimethyl secondary diamine polymer selected from a methylamine-terminated polyoxypropylene polymer, a methylamine-terminated polyoxypropylene polyoxyethylene copolymer, or a polymer having the formula:

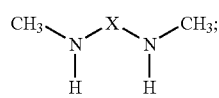

wherein X is a moiety having the formula:

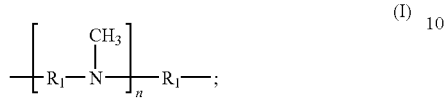

wherein $R_1$ and n are as defined previously; and the at least one N,N'-dimethyl secondary diamine has a $M_n$ from about 140 to about 1000; and
(ii) 10% to 90% by weight, based on total amine curing agent component, of at least one multifunctional amine having 3 or more active amine hydrogens; and
(b) an epoxy component comprising at least one multifunctional epoxy resin.

In a further aspect, the present invention provides a method for curing the amine-epoxy composition as indicated above. That is, the amine-epoxy composition comprises the contact product of an amine curing agent component and an epoxy component. In another aspect, the amine-epoxy composition is cured at a temperature of less than or equal to about 23° C. In yet another aspect, the amine-epoxy composition is cured at a temperature of less than or equal to about 5° C. The compositions of the present invention offer improved cure rates at temperatures at or below room temperature, including temperatures less than or equal to about 5° C., as compared to conventional amine-epoxy compositions.

The present invention also includes articles of manufacture comprising an amine-epoxy composition. The amine-epoxy composition comprises the contact product of an amine curing agent component and an epoxy component. Such articles can include, but are not limited to, a coating, an adhesive, a construction product, a flooring product, or a composite product. Additional components or additives can be used together with the compositions of the present invention to produce articles of manufacture.

In yet another aspect, an amine-epoxy composition is provided that comprises the contact product of an amine curing agent component and an epoxy component, the epoxy component comprising at least one multifunctional epoxy resin. In this aspect, the amine component comprises 90% to 10% by weight of methylamine-terminated poly-(N-methylazetidine) and 10% to 90% by weight of at least one multifunctional amine having 3 or more active amine hydrogens. The weight percentages are based on the total amine curing agent component.

An amine curing agent composition is provided in another aspect of the present invention. An amine curing agent composition in accordance with the present invention can be used to cure, harden, or crosslink an epoxy resin. Such a composition can comprise:
(i) 90% to 10% by weight, based on total amine curing agent composition, of at least one N,N'-dimethyl secondary diamine polymer having a number-average molecular weight ($M_n$) from about 140 to about 1000; and
(ii) 10% to 90% by weight, based on total amine curing agent composition, of at least one multifunctional amine having 3 or more active amine hydrogens.

Additionally, an amine-epoxy composition can comprise the contact product of the amine curing agent composition and an epoxy component comprising at least one multifunctional epoxy resin.

In another aspect, the present invention provides an amine curing agent composition which comprises:
(i) 90% to 10% by weight, based on total amine curing agent composition, of at least one N,N'-dimethyl secondary diamine polymer selected from a methylamine-terminated polyoxypropylene polymer, a methylamine-terminated polyoxypropylene polyoxyethylene copolymer, or a polymer having the formula:

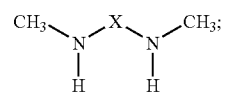

wherein X is a moiety having the formula (I), as indicated above; $R_1$ and n are as defined previously; and the at least one N,N'-dimethyl secondary diamine has a $M_n$ from about 140 to about 1000; and
(ii) 10% to 90% by weight, based on total amine curing agent composition, of at least one multifunctional amine having 3 or more active amine hydrogens.

In one aspect of the present invention, the amine component or amine composition can comprise up to 100% of the at least one N,N'-dimethyl secondary diamine polymer. In another aspect, the at least one N,N'-dimethyl secondary diamine polymer can be used in amounts between 10% and 90% of the total amine component. This percentage is a weight percentage based upon the weight of the total amine component. That is, the presence of additional components are not included in the weight percent calculation. For example, as used in the practice of manufacturing coatings, the amine component can be provided in a diluent or solvent such as benzyl alcohol. Thus, when a percentage by weight of an amine component or a composition of the present invention is discussed, the quantity will exclude the effect of any diluents or other additives, unless stated otherwise. As an example, if 65 parts by weight of a N,N'-dimethyl secondary diamine polymer and 35 parts by weight of a multifunctional amine are used in conjunction with 40 parts by weight benzyl alcohol and an additive (e.g., a filler) in a given application, the weight percent of the N,N'-dimethyl secondary diamine polymer is 65% based on the weight of the total amine component. The presence of additional materials does not affect the determination of the percentage of the at least one N,N'-dimethyl secondary diamine polymer in relation to the total weight of the amine component.

In accordance with one aspect of the present invention, 90% to 10% by weight of the total amine curing agent component or composition is the at least one N,N'-dimethyl secondary diamine. In another aspect, about 80% to about 20% by weight of the total amine curing agent component or composition is the at least one N,N'-dimethyl secondary diamine. In yet another aspect, about 75% to about 25% by weight of the total amine curing agent component or composition is the at least one N,N'-dimethyl secondary diamine.

The relative amount of the N,N'-dimethyl secondary diamine versus that of the multifunctional amine can vary depending upon, for example, the end-use article, its desired properties, and the fabrication method and conditions used to produce the end-use article. For instance, in coating applications, incorporating more N,N'-dimethyl secondary diamine relative to the amount of the multifunctional amine generally results in coatings which have greater flexibility, a broader re-coat window, and that cure faster and/or can be cured at lower temperatures. Conversely, incorporating relatively more multifunctional amine generally results in coatings with improved chemical resistance and often higher ultimate hardness.

An amine curing agent composition in accordance with another aspect of the present invention comprises:
(i) about 80% to about 20% by weight, based on total amine curing agent composition, of at least one N,N'-dimethyl secondary diamine selected from methylamine-terminated poly-(N-methylazetidine), methylamine-terminated poly-(N-methylazacycloheptane), or a combination thereof; and
(ii) about 20% to about 80% by weight, based on total amine curing agent composition, of at least one multifunctional amine having 6 or more carbon atoms and 3 or more active amine hydrogens.

In a further aspect, the weight percent, based on total amine curing agent composition, of at least one N,N'-dimethyl secondary diamine selected from methylamine-terminated poly-(N-methylazetidine), methylamine-terminated poly-(N-methylazacyclo-heptane), or a combination thereof, ranges from about 75% to about 25%.

The present invention also provides a method of making an epoxy resin composition comprising:
(a) forming an amine component comprising:
(i) 90% to 10% by weight, based on total amine component, of at least one N,N'-dimethyl secondary diamine polymer selected from a methylamine-terminated polyoxypropylene polymer, a methylamine-terminated polyoxypropylene polyoxyethylene copolymer, or a polymer having the formula:

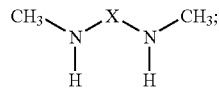

wherein X has the formula (I), as indicated above; $R_1$ and n are as defined above; and the at least one N,N'-dimethyl secondary diamine has a $M_n$ from about 140 to about 1000; and
(ii) 10% to 90% by weight, based on total amine component, of at least one multifunctional amine having 3 or more active amine hydrogens; and
(b) contacting the amine component with at least one multifunctional epoxy resin at a stoichiometric ratio of epoxy groups in the multifunctional epoxy resin to amine hydrogens in the amine component ranging from about 1.5:1 to about 1:1.5.

In accordance with the amine-epoxy compositions and methods of making an epoxy composition disclosed herein, the stoichiometric ratio of epoxy groups in the epoxy component to amine hydrogens in the amine component ranges from about 1.5:1 to about 1:1.5. In another aspect, the stoichiometric ratio ranges from about 1.3:1 to about 1:1.3.

Additionally, it can be beneficial in the compositions of the present invention for all of the components to be liquids at room temperature. That is, the at least one N,N'-dimethyl secondary diamine compound, the at least one multifunctional amine compound, and the at least one multifunctional epoxy resin compound are all liquids at room temperature. In this disclosure, room temperature is approximately 23° C. Applicants disclose several types of ranges in the present invention. These include, but are not limited to, a range of weight percentages, a range of temperatures, a range of number of atoms, a range of molecular weights, a range of integers, and a range of stoichiometric ratios. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R_1$" can be a $C_2$ to $C_8$ alkanediyl group, or in alternative language having from 2 to 8 carbon atoms, as used herein, refers to a "$R_1$" group that can be selected independently from an alkanediyl group having 2, 3, 4, 5, 6, 7, or 8 carbon atoms, as well as any range between these two numbers (for example, a $C_3$ to $C_6$ alkanediyl group), and also including any combination of ranges between these two numbers (for example, a $C_2$ to $C_4$ and $C_6$ to $C_8$ alkanediyl group).

Similarly, another representative example follows for the weight percent of the at least one N,N'-dimethyl secondary diamine, based on the weight of the total amine component. By a disclosure that about 20% to about 80% by weight of the total amine curing agent component is an at least one N,N'-dimethyl secondary diamine, for example, Applicants intend to recite that the weight percent can be selected from about 20%, about 21%, about 22%, about 23%, about 24%, about 25%, about 26%, about 27%, about 28% about 29%, about 30%, about 31%, about 32%, about 33%, about 34%, about 35%, about 36%, about 37%, about 38%, about 39%, about 40%, about 41%, about 42% about 43%, about 44%, about 45%, about 46%, about 47%, about 48%, about 49%, about 50%, about 51%, about 52%, about 53%, about 54%, about 55%, about 56%, about 57%, about 58%, about 59%, about 60%, about 61%, about 62%, about 63%, about 64%, about 65%, about 66%, about 67%, about 68%, about 69%, about 70%, about 71%, about 72%, about 73%, about 74%, about 75%, about 76%, about 77%, about 78%, about 79%, or about 80%. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or formulations described herein. Combining additional materials or components can be done by any method known to one of skill in the art.

While compositions and methods are described in terms of "comprising" various components or steps, the compositions and methods can also "consist essentially of" or "consist of" the various components or steps.

N,N'-Dimethyl Secondary Diamine

Polymeric compounds in accordance with this disclosure are described as either N,N'-dimethyl secondary diamine polymers or methylamine-terminated polymers, such as, for example, methylamine-terminated poly-(N-methylazetidine) or methylamine-terminated polyoxypropylene. Applicants' use of this nomenclature is to define that the terminus or end group on each side of the polymeric compound is a methylamine group. The methylamine end groups are illustrated in the following structure:

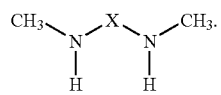

Compositions of the present invention comprise at least one N,N'-dimethyl secondary diamine polymer. N,N'-dimethyl secondary diamine polymers having a $M_n$ from about 140 to about 1000 are within the scope of the present invention. Further, the N,N'-dimethyl secondary diamine polymer can have a $M_n$ that is in a range from about 140 to about 750, from about 140 to about 500, or from about 140 to about 300. In another aspect of the present invention, the N,N'-dimethyl secondary diamine polymer has a $M_n$ in the range from about 150 to about 750, or from about 160 to about 500. In yet another aspect, the $M_n$ is in a range from about 160 to about 450, about 160 to about 400, about 160 to about 350, or about 160 to about 300. In a different aspect, the $M_n$ of the at least one N,N'-dimethyl secondary diamine polymer is in a range from about 165 to about 450, about 170 to about 400, about 175 to about 350, or about 180 to about 300.

The $M_n$ data in accordance with this disclosure, and the data presented in Examples 1-5 that follow, were determined using a Gas Chromatography (GC) technique. This procedure used a Hewlett-Packard 6890 Gas Chromatograph equipped with a flame ionization detector. The inlet was operated at 275° C. with a 10:1 split ratio. The GC technique used an initial temperature of 50° C. with an initial hold time of 2 minutes, followed by increasing the temperature at a rate of 7° C. per minute, up to a maximum temperature of 285° C. The maximum temperature was held for an additional 30 minutes. The column was a nominal 30 meter HP-5 (5% phenyl methyl silicone, 95% dimethyl silicone) capillary column with a nominal diameter of 530 μm and a nominal film thickness of 2.65 μm. The initial flow rate of helium was 4.2 mL/min.

The $M_n$ was determined by assuming that the mass of eluting material was proportional to the area percent obtained by this GC technique. Reaction by-products were not included in the $M_n$ calculation, and only polymeric species with sufficient volatility to elute under the GC conditions given above were included in the calculation. The $M_n$ was determined by dividing each area percent (proportional to mass) by the molecular weight of that particular polymeric species to yield the relative moles of that species. The sum of the relative moles of the polymeric species was then divided into the total area percent of the polymeric species to give $M_n$. The total area percent excludes the area percent of reaction by-products. Note that the calculation of $M_n$ of the polymeric sample includes, for example, when the integer n in formula (I) equals zero. As will be recognized by those skilled in the art, as $M_n$ increases, at some point an alternative technique such as Gel Permeation Chromatography (GPC) can be employed for the measurement of $M_n$, due to the low volatility of the higher molecular weight species in the distribution. For some N,N'-dimethyl secondary diamine polymers, this occurs when $M_n$ exceeds about 400.

In another aspect of the present invention, the at least one N,N'-dimethyl secondary diamine polymer can have an amine hydrogen equivalent weight (AHEW) from about 50 to about 500. Alternatively, the at least one N,N'-dimethyl secondary diamine has an AHEW from about 60 to about 400, about 70 to about 300, or about 80 to about 200. In a different aspect, the AHEW of the at least one N,N'-dimethyl secondary diamine is in a range from about 90 to about 150.

Yet, in another aspect, the N,N'-dimethyl secondary diamine can have the formula:

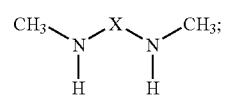

wherein X is a moiety selected from:

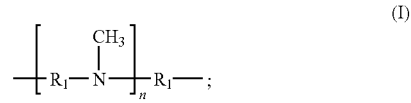

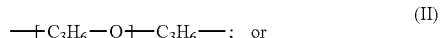

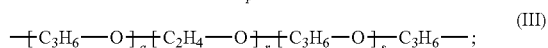

wherein:

$R_1$ is a $C_2$-$C_8$ linear or branched alkanediyl;

n, p, q, r, and s, independently, comprise integers, the respective average of these integers are determined as a function of $M_n$.

By describing $R_1$ as an "alkanediyl" moiety, Applicants are specifying the number of carbon atoms in the $R_1$ moiety, along with the number of hydrogen atoms required to conform to the rules of chemical valence for that diyl moiety. For example, in formula (I), the fact that $R_1$ is bonded to two other groups is consistent with this description of an alkanediyl moiety.

Unless otherwise specified, alkanediyl groups described herein are intended to include all structural isomers, linear or branched, of a given moiety; for example, all enantiomers and all diasteriomers are included within this definition. As an example, unless otherwise specified, the term propanediyl is meant to include 1,1-propanediyl, 1,2-propanediyl, 1,3-propanediyl, and 2,2-propanediyl. Similarly, butanediyl is meant to include all stereo and regio diyl isomers of butane, for example, n-butane-1,1-diyl, n-butane-1,2-diyl, n-butane-1,3-diyl, n-butane-1,4-diyl, n-butane-2,3-diyl, 2-methylpropane-1,1-diyl, 2-methylpropane-1,3-diyl, and so forth.

It is within the scope of the present invention that $R_1$ in the formula (I) is a $C_2$-$C_8$ linear or branched alkanediyl. In another aspect, $R_1$ is a $C_3$-$C_8$ linear or branched alkanediyl. In yet another aspect, $R_1$ is a $C_3$-$C_6$ linear or branched alkanediyl. Illustrative examples of N,N'-dimethyl secondary diamine polymer compounds having the formula (I) include, but are not limited to, methylamine-terminated poly-(N-methylazetidine), methylamine-terminated poly-(N-methylazacycloheptane), and the like. The nomenclature for methylamine-terminated poly-(N-methylazetidine) and methylamine-terminated poly-(N-methylazacycloheptane), for example, are based on the nomenclature of other ring-opening polymerization reactions and resulting polymers, such as the ring-opening polymerization of ethylene oxide to form poly-(ethylene oxide).

The N,N'-dimethyl secondary diamines of the present invention are described as polymers, indicating that they comprise at least one repeating unit. Applicants' use of the term "polymer" is meant to include all molecular weight polymers, including lower molecular weight polymers or oligomers. Since there is not an industry accepted cutoff in molecular weight between a polymer and an oligomer, Applicants have elected to use the term polymer throughout this disclosure and intend for the term polymer to encompass oligomers as well.

Since the compounds of the present invention are polymeric, they necessarily include mixtures of different size molecules, with different numbers of repeating units. Further, for a N,N'-dimethyl secondary diamine having the formula:

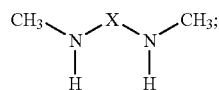

wherein X is a moiety selected from formulas (I), (II), or (III) as indicated above; the integers n, p, q, r, and s, respectively and independently, can be zero.

For instance, the moiety having the formula (I) illustrates a repeating unit in a N,N'-dimethyl secondary diamine polymeric compound, where the integer "n" represents the number of repeating units in any given molecule. Since the N,N'-dimethyl secondary diamine is a polymer, it is represented by a mixture of molecules of various sizes, i.e., various values of n. It is within the scope of the present invention for the integer n to vary from 0 to 50 or more. In a different aspect, n in formula (I) ranges from 0 to 40, or 0 to 30, or 0 to 20. In a further aspect, n ranges from 0 to 15. Yet, in another aspect, n ranges from 0 to 10. In a different aspect, n ranges from 1 to 50, from 1 to 40, from 1 to 30, or from 1 to 20, Further, n can range from 1 to 10 in one aspect of the present invention. It is understood that n represents an integer designating the number of repeating units for a single molecule within the polymer, where the polymer has a distribution of values of n, a distribution of molecular sizes, and a distribution of molecular weights. For any given N,N'-dimethyl secondary diamine polymer comprising a moiety having the formula (I), an average value of n can be readily determined from the number-average molecular weight, $M_n$. Determining an average value of n would not necessarily result in an integer or a whole number, depending upon the respective molecular weight distribution.

Similarly, the moiety having the formula (II) comprises a propyl ether repeating unit in an at least one N,N'-dimethyl secondary diamine polymer. One of skill in the art would recognize that such polymeric repeating units can be derived in a manner similar to propylene oxide polymerization. Thus, in one aspect of the present invention, the at least one N,N'-dimethyl secondary diamine polymer is methylamine-terminated polyoxypropylene. In formula (II), the integer "p" represents the number of repeating units in the methylamine-terminated polyoxypropylene. It is within the scope of the present invention for the integer p to vary from 0 to 50 or more. Alternatively, p in formula (II) ranges from 0 to 40, 0 to 30, or 0 to 20. In a different aspect, p ranges from 0 to 10. In another aspect, p ranges from 1 to 50, or 1 to 30, or 1 to 20, or 1 to 10.

The moiety having the formula (III) comprises propyl ether and ethyl ether repeating units in an at least one N,N'-dimethyl secondary diamine polymer. One of ordinary skill in the art would recognize that such polymeric repeating units can be derived in a manner similar to ethylene oxide and propylene oxide polymerization, where a polyethylene oxide chain has been capped with polypropylene oxide repeating units. Thus, in one aspect of the present invention, the at least one N,N'-dimethyl secondary diamine polymer is a methylamine-terminated polyoxypropylene polyoxyethylene copolymer. In formula (III), the integers "q", "r", and "s" represent the number of repeating units in the methylamine-terminated polyoxypropylene polyoxyethylene copolymer. It is within the scope of the present invention for these integers, independently, to range from 0 to 50 or more. Further, these integers can vary independently from 0 to 30, 0 to 20, or 0 to 10. Alternatively, the integers q, r, and s can vary independently from 1 to 40, 1 to 30, or 1 to 20, in another aspect of the present invention. In yet another aspect, integers q, r, and s range independently from 1 to 10.

Illustrative examples of N,N'-dimethyl secondary diamine polymer compounds in accordance with the present invention include, but are not limited to, methylamine-terminated poly-(N-methylazetidine), methylamine-terminated polyoxypropylene, methylamine-terminated polyoxypropylene polyoxyethylene copolymers, methylamine-terminated poly-(N-methylazacycloheptane), and the like, or any combination thereof. In a further aspect, the at least one N,N'-dimethyl secondary diamine is methylamine-terminated poly-(N-methyl-azetidine).

In accordance with the present invention, methods of making these novel compounds are disclosed. A method for making an N,N'-dimethyl secondary diamine polymer having a number-average molecular weight (Mn) from about 140 to about 1000, the polymer having the following formula:

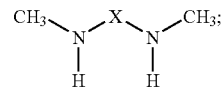

wherein X has the formula (I), as indicated above; $R_1$ and n are as defined above, which comprises (i) adding one of an appropriate nitrile and monomethylamine to the other in a reactor by delayed addition mode at about 40 to 80° C. in a nitrile to monomethylamine molar ratio of 0.6:1 to 2.2:1 to form an intermediate nitrile by the Michael addition reaction, and (ii) continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) a temperature from 70 to 150° C. and a hydrogenation catalyst at 0.75 to 5 wt % of the total intermediate nitrile feed. The hydrogenation catalyst is selected from Pt, Pd, Rh and Ru.

In another aspect, a desirable process for making an N,N'-dimethyl secondary diamine polymer having a Mn above 350 would entail making the intermediate nitrile using the nitrile and monomethylamine in a 1.8:1 to 2.1:1 molar ratio. The monomethylamine in the liquid phase would be at 0.1 to 0.25 wt ratio of monomethylamine to total intermediate nitrile feed, the hydrogenation catalyst would be from 1 to 5 wt % and the temperature would be from 90 to 140° C.

Methylamine-terminated poly-(N-methylazetidine) with a moiety of the formula (I) has the following chemical structure:

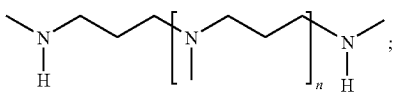

wherein n is an integer as defined above.

Methylamine-terminated poly-(N-methylazetidine) can be synthesized in a 2-step process of cyanoethylation followed by hydrogenation in a methylamine atmosphere. For example, methylamine-terminated poly-(N-methylazetidine) can be prepared by first combining methylamine and acrylonitrile in molar ratios ranging from about 1:1 to about 2:1 in a Michael reaction. Next, the resulting reaction product is hydrogenated in the presence of additional methylamine over a suitable metal catalyst such as, for example, platinum or palladium. Non-limiting examples of the synthesis of methylamine-terminated poly-(N-methylazetidine) in accordance with the present invention are illustrated in Examples 2-5 that follow.

Methylamine-terminated poly-(N-methylazacycloheptane) with a moiety of the formula (I) has the following chemical structure:

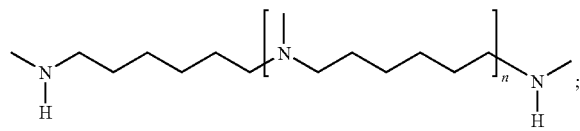

wherein n is as defined above.

Methylamine-terminated poly-(N-methylazacycloheptane) can be prepared by the hydrogenation of adiponitrile in the presence of methylamine over a suitable metal catalyst such as, for example, platinum or palladium. Adiponitrile is also referred to in the literature as adipodinitrile, or 1,4-dicyanobutane. A non-limiting example of the synthesis of methylamine-terminated poly-(N-methylazacycloheptane) in accordance with the present invention is illustrated in Example 1 that follows.

Other N,N'-dimethyl secondary diamines having the formula,

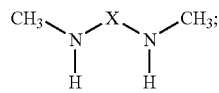

wherein X is the following moiety of the formula (I),

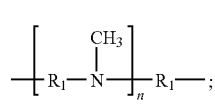

can be prepared in a manner similar to that illustrated for the synthesis of methylamine-terminated poly-(N-methylazacycloheptane). The integer n is as defined above. Based on the species selected for $R_1$, an appropriate dinitrile is selected. The respective dinitrile then can be hydrogenated in the presence of methylamine over a suitable metal catalyst such as, for example, platinum or palladium.

For example, one skilled in the art will recognize that an alternative method to prepare poly-(N-methylazetidine) is to select malononitrile as the dinitrile. An alternative method for the preparation of these N,N'-dimethyl secondary diamines is through selection of the appropriate methylamino substituted nitrile, which is then hydrogenated in the presence of methylamine over a suitable metal catalyst such as, for example, platinum or palladium. Thus, if $R_1$ is n-propanediyl, then 3-methylaminopropionitrile is selected; if $R_1$ is n-butanediyl, then 4-methylaminobutyronitrile is selected; if $R_1$ is n-pentanediyl, then 5-methylamino-valeronitrile is selected; if $R_1$ is n-hexanediyl, then 6-methylaminohexanenitrile is selected, and so forth.

Methylamine-terminated polyoxypropylene and methylamine-terminated polyoxypropylene polyoxyethylene copolymers can be prepared by starting with the corresponding secondary hydroxyl-terminated polypropylene oxide or secondary hydroxyl-terminated polyethylene oxide/polypropylene oxide, respectively. The process described in U.S. Pat. No. 3,654,370, which is incorporate herein by reference, can then be used, wherein methylamine is substituted for ammonia. A constructive example of the synthesis of methylamine-terminated polyoxypropylene in accordance with the present invention is illustrated in Constructive Example 6 that follows.

If desired, derivatives of N,N'-dimethyl secondary diamines can be employed for the practice of this invention. Such derivatives include polyamide derivatives, amidoamine derivatives, amine-epoxy adduct derivatives, and combinations thereof. These derivatives are well-known to those skilled in the art.

Multifunctional Amine

Compositions in accordance with the present invention can comprise at least one multifunctional amine. Multifunctional amine, as used herein, describes compounds with amine functionality and which contain three (3) or more active amine hydrogens.

It can be beneficial to limit the volatility of the specific multifunctional amine used in some applications where worker exposure and safety issues may arise. Thus, in one aspect of the present invention, the at least one multifunctional amine contains 6 or more carbon atoms. In another aspect, the at least one multifunctional amine contains 8 or more carbon atoms. In yet another aspect, the at least one multifunctional amine contains 12 or more carbon atoms.

Non-limiting examples of multifunctional amines that are within the scope of the present invention include, but are not limited to, an aliphatic amine, a cycloaliphatic amine, an aromatic amine, a Mannich base derivative of an aliphatic amine, a cycloaliphatic amine, or an aromatic amine, a polyamide derivative of an aliphatic amine, a cycloaliphatic amine, or an aromatic amine, an amidoamine derivative of an aliphatic amine, a cycloaliphatic amine, or an aromatic amine, an amine adduct derivative of an aliphatic amine, a cycloaliphatic amine, or an aromatic amine, and the like, or any combination thereof.

More than one multifunctional amine can be used in the compositions of the present invention. For example, the at least one multifunctional amine can comprise an aliphatic amine and a Mannich base derivative of a cycloaliphatic amine. Also, the at least one multifunctional amine can comprise one aliphatic amine and one different aliphatic amine.

Exemplary aliphatic amines include polyethylene amines (triethylenetetramine, tetraethylenepentamine, pentaethylenehexamine and the like), 1,6-hexanediamine, 3,3,5-trimethyl-1,6-hexanediamine, 3,5,5-trimethyl-1,6-hexanediamine, 2-methyl-1,5-pentanediamine (commercially available as Dytek-A), bis-(3-aminopropyl)amine, N,N'-bis-(3-aminopropyl)-1,2-ethanediamine, aminoethylpiperazine, and the like, or combinations thereof. Additionally, the poly(alkylene oxide) diamines and triamines commercially available under the Jeffamine name from Huntsman Corporation, are useful in the present invention. Illustrative examples include, but are not limited to, Jeffamine® D-230, Jeffamine® D-400, Jeffamine® D-2000, Jeffamine® D-4000, Jeffamine® T-403, Jeffamine® EDR-148, Jeffamine® EDR-192, Jeffamine® C-346, Jeffamine® ED-600, Jeffamine® ED-900, Jeffamine® ED-2001, and the like, or combinations thereof.

Cycloaliphatic and aromatic amines include, but are not limited to, 1,2-diaminocyclohexane, 1,3-diaminocyclohexane, 1,4-diaminocyclohexane, hydrogenated ortho-toluenediamine, hydrogenated meta-toluenediamine, metaxylylene diamine, hydrogenated metaxylylene diamine (referred to commercially as 1,3-BAC), isophorone diamine, various isomers or norbornane diamine, 3,3'-dimethyl-4,4'-diaminodicyclohexyl methane, 4,4'-diaminodicyclohexyl methane, 2,4'-diaminodicyclohexyl methane, a mixture of methylene bridged poly(cyclohexyl-aromatic)amines, and the like, or combinations thereof. The mixture of methylene bridged poly(cyclohexyl-aromatic)amines is abbreviated as either MBPCAA or MPCA, and is described in U.S. Pat. No. 5,280,091, which is incorporated herein by reference in its entirety. In one aspect of the present invention, the at least one multifunctional amine is a mixture of methylene bridged poly(cyclohexyl-aromatic)amines (MPCA).

Mannich base derivatives can be made by the reaction of the above described aliphatic amines, cycloaliphatic amines, or aromatic amines with phenol or a substituted phenol and formaldehyde. An exemplary substituted phenol used to make Mannich bases with utility in the present invention is cardanol, which is obtained from cashew nut shell liquid. Alternatively, Mannich bases can be prepared by an exchange reaction of a multifunctional amine with a tertiary amine containing a Mannich base, such as tris-dimethylaminomethylphenol (commercially available as Ancamine® K54 from Air Products and Chemicals, Inc.) or bis-dimethylaminomethylphenol. Polyamide derivatives can be prepared by the reaction of an aliphatic amine, cycloaliphatic amine, or aromatic amine with dimer fatty acid, or mixtures of a dimer fatty acid and a fatty acid. Amidoamine derivatives can be prepared by the reaction of an aliphatic amine, cycloaliphatic amine, or aromatic amine with fatty acids. Amine adducts can be prepared by the reaction of an aliphatic amine, cycloaliphatic amine, or aromatic amine with an epoxy resin, for example, with the diglycidyl ether of bisphenol-A, the diglycidyl ether of bisphenol-F, or epoxy novolac resins. The aliphatic, cycloaliphatic, and aromatic amines also can be adducted with monofunctional epoxy resins, such as phenyl glycidyl ether, cresyl glycidyl ether, butyl glycidyl ether, other alkyl glycidyl ethers, and the like.

Multifunctional Epoxy Resin

Amine-epoxy compositions of the present invention comprise an epoxy component, the epoxy component comprising at least one multifunctional epoxy resin. Multifunctional epoxy resin, as used herein, describes compounds containing 2 or more 1,2-epoxy groups per molecule. Epoxide compounds of this type are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present invention comprise the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present invention:

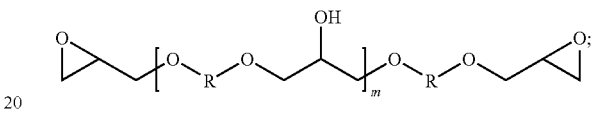

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present invention.

In another aspect, epoxy novolac resins, which are the glycidyl ethers of novolac resins, can be used as multifunctional epoxy resins in accordance with the present invention. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products ranges from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature.

Depending upon the end-use application, it can be beneficial to reduce the viscosity of the compositions of the present invention by modifying the epoxy component. For example, the viscosity can be reduced to allow an increase in the level of pigment in a formulation or composition while still permitting easy application, or to allow the use of a higher molecular weight epoxy resin. Thus, it is within the scope of the present invention for the epoxy component, which comprises at least one multifunctional epoxy resin, to further comprise a monofunctional epoxide. Examples of monoepoxides include, but are not limited to, styrene oxide, cyclohexene oxide, ethylene oxide, propylene oxide, butylene oxide, and the glycidyl ethers of phenol, cresols, tert-butylphenol, other alkyl phenols, butanol, 2-ethylhexanol, $C_4$ to $C_{14}$ alcohols, and the like.

Miscellaneous Additives

Compositions of the present invention can be used to produce various articles of manufacture. Depending on the requirements during the manufacturing of or for the end-use application of the article, various additives can be employed in the formulations and compositions to tailor specific properties. These additives include, but are not limited to, solvents, accelerators, plasticizers, fillers, fibers such as glass or carbon fibers, pigments, pigment dispersing agents, rheology modifiers, thixotropes, flow or leveling aids, defoamers, or any combination thereof. It is understood that other mixtures or materials that are known in the art can be included in the compositions or formulations and are within the scope of the present invention.

Further, compositions within the scope of the present invention can be solventless, also referred to as solvent-free or 100% solids. Alternatively, these compositions can further comprise at least one solvent (a solvent is also referred to as a diluent). Often, a solvent or mixture of solvents is chosen to give a specific evaporation rate profile for the composition or formulation, while maintaining solubility of the components of the formulation.

Articles

The present invention also is directed to articles of manufacture comprising the compositions disclosed herein. For example, an article can comprise an amine-epoxy composition which comprises the contact product of an amine curing agent component and an epoxy component. The amine curing agent component can comprise at least one N,N'-dimethyl secondary diamine and at least one multifunctional amine. The epoxy component can comprise at least one multifunctional epoxy resin. Optionally, various additives can be present in the compositions or formulations used to produce fabricated articles, dependent upon the desired properties. These additives can include, but are not limited to, solvents, accelerators, plasticizers, fillers, fibers such as glass or carbon fibers, pigments, pigment dispersing agents, rheology modifiers, thixotropes, flow or leveling aids, defoamers, or any combination thereof.

Articles in accordance with the present invention include, but are not limited to, a coating, an adhesive, a construction product, a flooring product, or a composite product. Coatings based on these amine-epoxy compositions can be solvent-free or can contain solvents or diluents as needed for the particular application. For example, coatings with solids content greater than 50%, greater than 65%, greater than 75%, or greater than 85%, are within the scope of the present invention. Coatings can contain various types and levels of pigments for use in paint applications.

Numerous substrates are suitable for the application of coatings of this invention with proper surface preparation, as is well known to one of ordinary skill in the art. Such substrates include, but are not limited to, concrete and various types of metals and alloys, such as steel and aluminum. For example, the low temperature cure, good surface appearance when applied at room temperature, and good flexibility properties of the coatings of the present invention make them suitable for the painting or coating of large metal objects or cementitious substrates which must be painted and/or cured at room temperature or colder conditions, including ships, bridges, industrial plants and equipment, and floors. Coatings of this invention can be applied and cured at temperatures ranging from about −10° C. to about 50° C., or alternatively, at temperatures ranging from about 0° C. to about 35° C. As needed, these coatings also can be force cured at higher temperatures, which often can improve the flexibility of the cured material.

Coatings of this invention can be applied by any number of techniques including spray, brush, roller, paint mitt, and the like. In order to apply very high solids content or 100% solids coatings of this invention, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present invention in combination with concrete or other materials commonly used in the construction industry. Compositions of the present invention can be used in the construction of epoxy-based floors, often in applications requiring better mechanical properties (e.g., improved tensile strength or improved compressive strength) or better elongation than that normally obtained from cementitious or other similar types of flooring materials. Crack injection and crack filling products also can be prepared from the compositions disclosed herein, as well as polymer modified cements, tile grouts, and the like. Non-limiting examples of composite products or articles comprising amine-epoxy compositions disclosed herein include tennis rackets, skis, bike frames, airplane wings, glass fiber reinforced composites, and other molded products.

EXAMPLES

Coatings of amine-epoxy compositions were prepared and tested as follows. Hardener mixtures or compositions, including amine compositions in accordance with the present invention, were prepared by contacting and mixing the components given in the tables that follow. The respective hardener mixture or composition, or the individual hardener, was then mixed with a multifunctional epoxy resin at the use level indicated in the tables in parts per hundred weight resin (PHR). The epoxy resin used in these examples was the diglycidyl ether of bisphenol-A (DGEBA), grade D.E.R.™ 331 with an EEW in the range of 182 to 192. This epoxy resin is commercially available from the Dow Chemical Company.

In Examples 7-38, clear coatings were applied to standard glass panels to produce samples for drying time testing using a Beck-Koller drying time recorder and for hardness development by the Persoz pendulum hardness method. Clear coatings for drying time by the thumb twist method and for specular gloss testing were applied to uncoated, matte paper charts (AG5350, Byk). Coatings were applied at about 75 µm WFT (wet film thickness) using a Bird bar applicator resulting in dry film thicknesses ranging from approximately 60 to 70 µm. Coatings of Examples 7-29 were cured either at 5° C. and 80% RH (relative humidity) or 25° C. and 60% RH using a Weiss climate chamber (type WEKK0057). Coatings of Examples 30-38 were cured either at 10° C. and 60% RH or 23° C. and 60% RH using the Weiss climate chamber. Persoz Hardness was measured at the times indicated in the tables.

Clear coatings for impact resistance and mandrel bend testing were applied to respectively cold-rolled steel test panels, ground one side (approximate size 76 mm×152 mm) and cold-rolled steel, smooth finish (approximate size 76 mm×152 mm), using a nominal 75 WFT wire bar. Metal test panels were obtained from Q Panel Lab Products. Films were cured according to the following schedules: (A) 14 days room temperature, room temperature being approximately 23° C.; (B) 14 days room temperature followed by 2 hours at 80° C.; or (C) 60 days room temperature. Dry film thicknesses were from about 60 to 80 μm following cure schedules A and C, and from about 50 to 55 μm following schedule B.

The mix viscosities for Examples 7-29 were determined using a Rheolab MC20 apparatus (Physica) equipped with a Viscotherm VT10 water bath and MC20 temperature control unit. The equipment was set up with the TEK 150 cone-plate and connected to a computer. After the apparatus was equilibrated at 25° C., the gap between the cone (MK22) and plate was set to approximately 50 μm. Samples were equilibrated at 25° C. for 24 hours before testing. After mixing as indicated, excess product running out of the gap was removed and the rotational viscosity of the mixed product was recorded at a 200 reciprocal second shear rate after 30 seconds.

Shore A and Shore D data were obtained at the times indicated in the tables using approximately 5 mm thick epoxy castings. Castings were cured either at 10° C. and 60% RH or 23° C. and 60% RH using the Weiss climate chamber.

Mechanical strength properties of the amine-epoxy castings were determined using a dual column materials testing machine (Instron, model 4206-006) equipped with a 104 kN load cell. For recording compressive strength data of cubes of around 2×2×2 cm, the machine was equipped with compressive plates and a Dynamic 25/50 mm GL Extensiometer and operated at a crosshead speed of 2.5 mm/min. Tensile strength data were recorded using wedge grips at a crosshead speed of 25 mm/min. The amine-epoxy castings were prepared at approximately 23° C. and cured for 7 days prior to testing.

The pull-off adhesion strengths of clearcoat amine-epoxy castings from both dry and wet concrete slabs were recorded using a P.A.T. Pull-Off Adhesion Tester. Standard pre-cast concrete slabs (approximate size 30×30×5 cm) were obtained from a local supplier and stored dry at room temperature. For measuring the adhesion to dry concrete, the concrete slabs were used without further preparation and were coated with about 200 g/m² of the respective amine-epoxy formulation. Under wet conditions, concrete slabs were completely immersed in water for 24 hours prior to applying the same amine-epoxy coating formulation at about 200 g/m². After 7 days cure at ambient temperature, the flat end of a steel-faced, metal cylinder (approximate 20 mm diameter) was glued to the coating surface using a fast curing two-component adhesive. The material in a circumference around the metal cylinder was carefully removed down to the substrate, after which the adhesion/cohesion strength and the mode of failure were recorded. In the tables, the following abbreviations apply: A=cohesive failure of substrate; A/B=adhesive failure between substrate and primer; Y=cohesive failure of adhesive; and, Y/Z=adhesive failure between adhesive and cylinder.

The mix viscosities and hardener viscosities for Examples 30-38 were determined at 23° C. using a Brookfield DVI+ viscometer equipped with Spindle 5. Gelation time, or gel-time, was recorded as the time after mixing the epoxy resin and the respective hardener to reach a defined point of viscosity. For this, a Techne GT3 Gelation Timer, equipped with disposal glass plungers (approximate size 22×5 mm) and operating at one cycle per minute, was used. Samples were equilibrated at 23° C. for 24 hours before testing. Gelation time was recorded for an approximate 150 g mixture charged to a 250-ml glass jar and maintained at a constant temperature of 23° C.

Coating properties were measured in accordance with the standard test methods listed in Table 1. Waterspot resistance is tested by placing drops of water on the surface of the coating for a specified time and observing the impact on the coating. This test is used in the industry to determine if the surface of the coating is damaged or aesthetically impacted by extended contact with water or moisture.

TABLE 1

Analytical test methods.

| Property | Response | Test Method |
| --- | --- | --- |
| Drying Time: Beck-Koller Recorder | Thin film set times, phases 2 & 3 (h) | ASTM D5895 |
| Drying Time: Thumb Twist Method | Set-to-touch and thumb-twist time (h) | ASTM D1640 |
| Specular Gloss | Gloss at 20° and 60° | ISO 2813, ASTM D523 |
| Persoz Pendulum Hardness | Persoz hardness (s) | ISO 1522, ASTM D4366 |
| Impact Resistance - Tubular Impact Tester | Direct and reverse impact (kg · cm) | ISO 6272, ASTM D2794 |
| Mandrel Bend Test: Cylindrical Bend | Elongation (%) | ISO 1519, ASTM D1737 |
| Mandrel Bend Test: Conical Bend | Elongation (%) | ISO 6860, ASTM D522 |
| Shore A & D Hardness | Shore A or Shore D | ISO 868, ASTM D2240 |
| Compressive Properties - Dual Column Materials Testing Machine | Compressive Strength (MPa) & Modulus (GPa) | ASTM C579-96 |
| Tensile Properties - Dual Column Materials Testing Machine | Tensile Strength (MPa), Modulus (GPa), and Elongation (%) | ASTM D638-99 |
| Pull-Off Adhesion | Adhesion (MPa) | ISO 4624 |

Example 1

Synthesis of methylamine-terminated poly-(N-methylazacycloheptane)

135 g of adipodinitrile, 50 g of isopropanol, and 2.7 g of Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation. The reactor was sealed and subsequently purged with nitrogen and hydrogen to remove any air from the reactor. While stirring the reactor contents, 85 g of anhydrous methylamine were added to the reactor. The reactor was then pressurized with hydrogen to 1.72 MPa (250 psi), and heated to 120° C. These conditions were maintained until the rate of hydrogen uptake from the ballast tank fell below 0.0034 MPa/min (0.5 psi/min). When this occurred, the reactor pressure was raised to 5.86 MPa (850 psi). These conditions were maintained until the rate of hydrogen uptake from the ballast tank fell below 0.0034 MPa/min (0.5 psi/min). The reactor was cooled to room temperature and depressurized, and the reaction product was filtered to remove the catalyst. Solvent was then removed by rotary evaporation. The resulting reaction product was methylamine-terminated poly-(N-methylazacycloheptane) with an estimated amine hydrogen equivalent weight (ANEW) of about 121. The $M_n$ was determined to be approximately 184 using the GC technique described above. Methylamine-terminated poly-(N-methylazacycloheptane) has the following chemical structure:

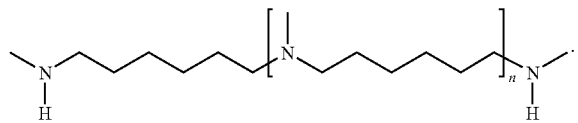

In the tables that follow, the methylamine-terminated poly-(N-methylazacycloheptane) compound of Example 1 is designated as dimethyl secondary diamine 1, abbreviated DSD-1. DSD-1 was analyzed using gas chromatography (GC) and had the following polymer distribution by area percent, with "others" representing reaction by-products which were not separated or identified using GC, nor used in determining $M_n$:

| | |
|---|---|
| n = 0 | 47.6% |
| n = 1 | 35.7% |
| n = 2 | 5.8% |
| others | 10.9% |

Example 2

Synthesis of methylamine-terminated poly-(N-methylazetidine)

282 g of acrylonitrile and 8.5 g of water were placed in a 1-liter stainless-steel batch pressure reactor equipped with a stirrer. The reactor was sealed and subsequently purged with nitrogen to remove any air from the reactor. While stirring the reactor contents, 200 g of methylamine were added to the reactor over a time period of 5 hours. During the addition of the methylamine, the reactor temperature was maintained in range of 55-60° C. This temperature range was then maintained for 1.5 hours after the methylamine addition was complete. The reactor was cooled and the intermediate product removed.

120 g of isopropanol and 7.5 g of Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation. The reactor was sealed and subsequently purged with nitrogen and hydrogen to remove any air from the reactor. While stirring the reactor contents, 90 g of anhydrous methylamine were added to the reactor. The reactor was then pressurized with hydrogen to 5.86 MPa (850 psi), and heated to 120° C. Over a time period of 5 hours, 450 g of the intermediate product described above were added to the reactor. Substantially constant reactor conditions were maintained for approximately 2 more hours after the addition of the intermediate product was complete, at which time the rate of hydrogen uptake from the ballast tank fell below 0.0034 MPa/min (about 0.5 psi/min). The reactor was cooled to room temperature and depressurized, and the reaction product was filtered to remove the catalyst. The solvent was then removed by rotary evaporation. The resulting reaction product was methylamine-terminated poly-(N-methylazetidine) with an estimated AHEW of about 100. The $M_n$ was determined to be approximately 198 using the GC technique described above. Methylamine-terminated poly-(N-methylazetidine) has the following chemical structure:

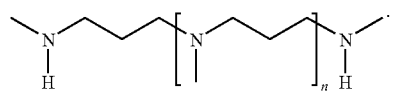

In the tables that follow, the methylamine-terminated poly-(N-methylazetidine) compound of Example 2 is designated as dimethyl secondary diamine 2, abbreviated DSD-2. DSD-2 was analyzed using GC and had the following polymer distribution by area percent, with "others" representing reaction by-products which were not separated or identified using GC, nor used in determining $M_n$:

| | |
|---|---|
| n = 0 | 12.6% |
| n = 1 | 26.1% |
| n = 2 | 25.5% |
| n = 3 | 14.7% |
| n = 4 | 7.3% |
| n = 5 | 3.5% |
| Others | 10.3% |

Example 3

Synthesis of methylamine-terminated poly-(N-methylazetidine)

282 g of acrylonitrile and 8.5 g of water were placed in a 1-liter stainless-steel batch pressure reactor equipped with a stirrer. The reactor was sealed and subsequently purged with nitrogen to remove any air from the reactor. While stirring the reactor contents, 87 g of methylamine were added to the reactor over a time period of 5 hours. During the addition of the methylamine, the reactor temperature was maintained in range of 55-60° C. This temperature range was then maintained for 1.5 hours after the methylamine addition was complete. The reactor was cooled and the intermediate product removed.

120 g of isopropanol and 7 g of Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation. The reactor was sealed and subsequently purged with nitrogen and hydrogen to remove any air from the reactor. While stirring the reactor contents, about 160 g of anhydrous methylamine were added to the reactor. The reactor was then pressurized with hydrogen to 5.86 MPa (850 psi), and heated to 120° C. Over a time period of 5 hours, 350 g of the intermediate product described above were added to the reactor. Substantially constant reactor conditions were maintained for approximately 2 more hours after the addition of the intermediate product was complete, at which time the rate of hydrogen uptake from the ballast tank fell below 0.0034 MPa/min (0.5 psi/min). The reactor was cooled to room temperature and depressurized, and the reaction product was filtered to remove the catalyst. The solvent was then removed by rotary evaporation. The resulting reaction product was methylamine-terminated poly-(N-methylazetidine) with an estimated AHEW of about 113. The $M_n$ was determined to be approximately 253 using the GC technique described above. Methylamine-terminated poly-(N-methylazetidine) has the following chemical structure:

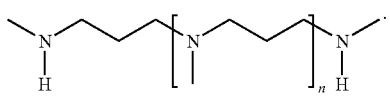

In the tables that follow, the methylamine-terminated poly-(N-methylazetidine) compound of Example 3 is designated as dimethyl secondary diamine 3, abbreviated DSD-3. DSD-3 was analyzed using GC and had the following polymer distribution by area percent, with "others" representing reaction by-products which were not separated or identified using GC, nor used in determining $M_n$:

| | |
|---|---|
| n = 0 | 2.8% |
| n = 1 | 16.6% |
| n = 2 | 18.2% |
| n = 3 | 20.7% |
| n = 4 | 12.2% |
| n = 5 | 9.2% |
| Others | 20.3% |

Example 4

Synthesis of methylamine-terminated poly-(N-methylazetidine)

142.5 parts by weight of acrylonitrile and 3 parts of water were placed in a 1-liter stainless-steel batch pressure reactor equipped with a stirrer. The reactor was sealed and subsequently purged with nitrogen to remove any air from the reactor. While stirring the reactor contents, 100 parts by weight of methylamine were added to the reactor over a time period of 4 hours. During the addition of the methylamine, the reactor temperature was maintained at 55° C. This temperature was then maintained for 1.5 hours after the methylamine addition was complete. The reactor was cooled and the intermediate product removed.

35 parts by weight of isopropanol and 1.5 parts of Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation. The reactor was sealed and subsequently purged with nitrogen and hydrogen to remove any air from the reactor. While stirring the reactor contents, 30 parts by weight of anhydrous methylamine were added to the reactor. The reactor was then pressurized with hydrogen to 5.86 MPa (850 psi), and heated to 120° C. Over a time period of 4 hours, 100 parts by weight of the intermediate product described above were added to the reactor. Substantially constant reactor conditions were maintained for approximately 2 more hours after the addition of the intermediate product was complete, at which time the rate of hydrogen uptake from the ballast tank fell below 0.0034 MPa/min (0.5 psi/min). The reactor was cooled to room temperature and depressurized, and the reaction product was filtered to remove the catalyst. The solvent was then removed by rotary evaporation. The resulting reaction product was methylamine-terminated poly-(N-methylazetidine) with an estimated AHEW of about 117. It had and acid value of 877 mg KOH/g and the Brookfield viscosity was determined to be 17 mPa·s using spindle S62 @ 100 rpm. The $M_n$ was determined to be approximately 239 using the GC technique described above. Methylamine-terminated poly-(N-methylazetidine) has the following chemical structure:

In the tables that follow, the methylamine-terminated poly-(N-methylazetidine) compound of Example 4 is designated as dimethyl secondary diamine 4, abbreviated DSD-4. DSD-4 was analyzed using GC and had the following polymer distribution by area percent, with "others" representing reaction by-products which were not separated or identified using GC, nor used in determining $M_n$:

| | |
|---|---|
| n = 0 | 7.2% |
| n = 1 | 17.6% |
| n = 2 | 18.2% |
| n = 3 | 15.8% |
| n = 4 | 11.3% |
| n = 5 | 7.9% |
| n = 6 | 4.7% |
| n = 7 | 2.5% |
| Others | 14.8% |

Example 5

Synthesis of methylamine-terminated poly-(N-methylazetidine)

273.5 parts by weight of acrylonitrile and 5.5 parts of water were placed in a 1-liter stainless-steel batch pressure reactor equipped with a stirrer. The reactor was sealed and subsequently purged with nitrogen to remove any air from the reactor. While stirring the reactor contents, 100 parts by weight of methylamine were added to the reactor over a time period of 4 hours. During the addition of the methylamine, the reactor temperature was maintained at approximately 55° C. This temperature was then maintained for 1.5 hours after the methylamine addition was complete. The reactor was cooled and the intermediate product removed.

35 parts by weight of isopropanol and 1.5 parts of Pd/Al$_2$O$_3$ catalyst were placed in a 1-liter stainless-steel batch pressure reactor equipped with a stirrer and 1-liter hydrogen ballast tank. The Pd/Al$_2$O$_3$ catalyst is commercially available from the Johnson-Mathey Corporation. The reactor was sealed and subsequently purged with nitrogen and hydrogen to remove any air from the reactor. While stirring the reactor contents, 30 parts by weight of anhydrous methylamine were added to the reactor. The reactor was then pressurized with hydrogen to 5.86 MPa (850 psi), and heated to 120° C. Over a time period of 4 hours, 100 parts by weight of the intermediate product described above were added to the reactor. Substantially constant reactor conditions were maintained for approximately 2 more hours after the addition of the intermediate product was complete, at which time the rate of hydrogen uptake from the ballast tank fell below 0.0034 MPa/min (0.5 psi/min). The reactor was cooled to room temperature and depressurized, and the reaction product was filtered to remove the catalyst. The solvent was then removed by rotary evaporation. The resulting reaction product was methylamine-terminated poly-(N-methylazetidine) with an estimated AHEW of about 113. It had an acid value of 837 mg KOH/g and the Brookfield viscosity was determined to be 21 mPa·s using spindle S62 @ 100 rpm. The $M_n$ was determined to be approximately 273 using the GC technique described above. Methylamine-terminated poly-(N-methylazetidine) has the following chemical structure:

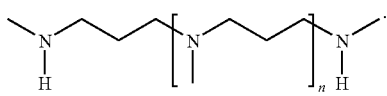

In the tables that follow, the methylamine-terminated poly-(N-methylazetidine) compound of Example 5 is designated as dimethyl secondary diamine 5, abbreviated DSD-5. DSD-5 was analyzed using GC and had the following polymer distribution by area percent, with "others" representing reaction by-products which were not separated or identified using GC, nor used in determining $M_n$:

| | |
|---|---|
| n = 0 | 3.4% |
| n = 1 | 11.0% |
| n = 2 | 15.8% |
| n = 3 | 17.0% |
| n = 4 | 12.7% |
| n = 5 | 10.7% |
| n = 6 | 6.7% |
| n = 7 | 0.9% |
| Others | 17.8% |

Constructive Example 6

Constructive Synthesis of Methylamine-Terminated Polyoxypropylene

The synthesis reaction can be carried out in a continuous reactor such as a stainless steel tube of about 3.175 cm inside diameter and about 69 cm in length. First, place about 487 mL of a pre-reduced, pelletized nickel-copper-chromium catalyst in the reactor. The catalyst can contain approximately 75 mole percent nickel, 23 mole percent copper and 2 mole percent chromium, as described in U.S. Pat. No. 3,654,370, which is incorporated herein by reference. To the reactor contents, add hydrogen at a rate of about 160 liters per hour (measured at 0° C. and 1 atmosphere pressure), methylamine at a rate of about 686 g/hr, and an approximate 50% solution of polypropylene glycol in cyclohexane at a rate of about 304 g/hr. The molecular weight of the polypropylene glycol used in this synthesis can be around 400. The reactor temperature should be controlled at around 240° C., and the pressure maintained at approximately 3000 psig.

The reactor effluent is subsequently stripped of methylamine and cyclohexane by heating to approximately 150° C. The resulting reaction product is a liquid comprising methylamine-terminated polyoxypropylene. The reaction product should have in excess of about 90% of the theoretical content of amino groups, and less than 10% of the original hydroxyl groups. Typically, above about 90% of the amine groups are secondary amino groups resulting in the desired product, methylamine-terminated polyoxypropylene, which is a N,N'-dimethyl secondary diamine polymer. The distribution of molecular sizes and the $M_n$ can then be determined using the GC technique previously described. Additional, the AHEW can be estimated for the methylamine-terminated polyoxypropylene using analytical methods that are well known to those skilled in the art.

Comparative Examples 7-11

Coatings Made from Comparative Epoxy-Hardener Compositions

Formulations and the resulting properties of comparative examples 7-11 are illustrated in Tables 2-3. As indicated in the tables, the coating of Example 7 exhibited both slow dry speed and slow hardness development at room temperature, and particularly at 5° C. Example 7 used a polyamide adduct curing agent. The coating of Example 8 used an aliphatic amine curing agent which was high in viscosity and therefore had low solids at application viscosity. Also, the coating of Example 8 had poor impact resistance. The coatings based on phenalkamines, Examples 9-10, had slow dry speeds at 5° C., particularly as measured by the thumb twist method. Additionally, the coatings of Examples 9-10 exhibited poor hardness development, waterspot resistance, reverse impact and mandrel bend flexibility. The conventional low viscosity polyamide curing agent of Example 11 produced visually poor coatings with slow dry speed at 5° C., as well as poor flexibility as measured by conical, mandrel, and impact resistance test results.

TABLE 2

Comparative examples cured at 25° C. or following cure schedules A-C.

| Example | 7 | 8 | 9 | 10 | 11 |
|---|---|---|---|---|---|
| Comparative Hardener | A2050 | A2603 | NC541LV | CX-105 | A 350A |
| Use Level (PHR) | 80 | 90 | 67 | 76 | 50 |
| Mix Viscosity (mPa · s) | 6,500 | 4,000 | 6,250 | 22,000 | 10,300 |
| Coating Solids (weight %) | | | | | |
| At mix viscosity | 87 | 81 | 100 | 100 | 100 |
| Diluted to 1 Pa · s $^a$ | — | 76 | 94 | 87 | 90 |
| Thin Film Set Time (h) | | | | | |
| Phase 2/Phase 3 | 7.5/>12 | 1.7/3.0 | 4.6/5.8 | —/— | —/— |

TABLE 2-continued

Comparative examples cured at 25° C. or following cure schedules A-C.

| Example | 7 | 8 | 9 | 10 | 11 |
|---|---|---|---|---|---|
| Coating Appearance | | | | | |
| Specular Gloss 20°/60° | 100/101 | 97/101 | 82/92 | 10/50 | — |
| Visual | high gloss | High gloss | glossy | semi gloss | greasy |
| Persoz Hardness (s) | | | | | |
| Day 1/Day 7 | 25/270 | 235/340 | 165/275 | 90/190 | —/— |
| Impact Resistance (kg · cm) Direct/Reverse | | | | | |
| Schedule A | 150/30 | 65/6 | 125/20 | 85/17 | 70/6 |
| Schedule B | >200/60 | 80/10 | 115/45 | | |
| Schedule C | 110/10 | 70/6 | | | |
| Mandrel Bend (% elongat.) | | | | | |
| Schedule A | 6.5 | 4.1 | 5.2 | 5.3 | <3 |
| Conical Bend (% elongat.) | | | | | |
| Schedule A | 7.4 | 6.2 | <2 | <2 | <2 |

$^a$ adjusted with xylene:butanol (3:1) to match comparable application viscosity

TABLE 3

Comparative examples cured at 5° C.

| Example | 7 | 8 | 9 | 10 | 11 |
|---|---|---|---|---|---|
| Thin Film Set Time (h) | | | | | |
| Phase 2/Phase 3 | >48/>48 | 6.7/15 | 14/20 | 9.7/15.2 | 30/34 |
| Coating Appearance | | | | | |
| Specular Gloss 20°/60° | —/— | 96/101 | 40/80 | 12/34 | —/— |
| Visual | tacky | High gloss | greasy | matte | tacky |
| Persoz Hardness (s) | | | | | |
| Day 2/Day 7 | —/85 | 25/200 | —/115 | 25/75 | —/25 |
| Thumb Twist method | | | | | |
| Set-to-Touch Time (h) | >28 | 10 | 22 | 24 | >28 |
| Dry-to-Handle Time (h) | — | 12 | 26 | >28 | — |
| Waterspot Resistance | | | | | |
| Day 1/Day 7 (1-5, 5 = best) | —/4 | 5/5 | 1/3 | 2/3 | 2/3 |

Inventive Examples 12-21 and Comparative Examples 22-23

Coatings Made from Amine-Epoxy Compositions

Formulations and the resulting properties of inventive examples 12-21 and comparative examples 22-23 are shown in Tables 4-5. Examples 12-21 illustrate the properties obtained from exemplary formulations and coatings utilizing compositions comprising N,N'-dimethyl secondary diamines with multifunctional amines in accordance with the present invention. Comparative examples 22-23 illustrate coating properties using multifunctional amines absent N,N'-dimethyl secondary diamines.

As indicated in the tables, Examples 12-13 utilized compositions comprising DSD-1 (a methylamine-terminated poly-(N-methylazacycloheptane) polymeric compound) with a multifunctional amine, MPCA. The coatings of Examples 12-13 exhibited very fast dry speeds, and outstanding impact flexibility. In part, this is exemplified by comparing the thin film set time and impact resistance at 25° C. for Examples 12-13 with the comparable coating properties of Examples 22-23.

Examples 14-21 utilized compositions comprising a methylamine-terminated poly-(N-methylazetidine) polymeric compound (DSD-2, DSD-3, or DSD-4) and at least one multifunctional amine. The coatings of Examples 14-21 exhibited varying combinations of fast dry speeds, rapid hardness development, good surface appearance, and outstanding impact resistance and flexibility. For instance, Examples 15, 17, and 18 each provided a beneficial combination of properties for applications requiring fast thin film set time at both 25° C. and 5° C., rapid hardness development at 25° C., and superior impact resistances and mandrel or conical bend flexibility. As indicated in Examples 22-23, this combination of properties was not duplicated by the multifunctional amines alone.

TABLE 4

Examples 12-23 cured at 25° C. or following cure schedules A-C.

| Example | 12 | | 13 | | 14 | | 15 | |
|---|---|---|---|---|---|---|---|---|
| Hardener Composition (Parts by Weight) | DSD-1 | 66 | DSD-1 | 78 | DSD-2 | 62 | DSD-2 | 74 |
| | MPCA | 34 | MPCA | 22 | MPCA | 38 | MPCA | 26 |
| | BA | 43 | BA | 43 | BA | 43 | BA | 43 |
| Use Level (PHR) with DGEBA | 70 | | 76 | | 58 | | 63 | |
| Mix Viscosity (mPa · s) | — | | — | | 650 | | 420 | |
| Coating Solids (weight %) | 88 | | 87 | | 89 | | 88 | |
| Thin Film Set Time (h) | | | | | | | | |
| Phase 2/Phase 3 | 2.8/3.5 | | 2.8/3.5 | | 3.1/3.5 | | 3.4/3.9 | |
| Coating Appearance | | | | | | | | |
| Specular Gloss 20°/60° | 98/98 | | 97/98 | | 103/100 | | 100/100 | |
| Visual | high gloss | | high gloss | | high gloss | | high gloss | |
| Persoz Hardness (s) | | | | | | | | |
| Day 1/Day 7 | 285/295 | | 185/200 | | 305/330 | | 265/310 | |
| Impact Resistance (kg · cm) Direct/Reverse | | | | | | | | |
| Schedule A | >200/>200 | | >200/>200 | | 75/<5 | | 170/12 | |
| Schedule B | >200/>200 | | >200/>200 | | 195/70 | | >200/130 | |
| Schedule C | | | | | | | | |
| Mandrel Bend (% elongat.) | | | | | | | | |
| Schedule A | — | | — | | 5.2 | | 11 | |
| Conical Bend (% elongat.) | | | | | | | | |
| Schedule A | — | | — | | 4.8 | | >33 | |

| Example | 16 | | 17 | | 18 | | 19 | |
|---|---|---|---|---|---|---|---|---|
| Hardener Composition (Parts by Weight) | DSD-2 | 55 | DSD-3 | 65 | DSD-3 | 77 | DSD-3 | 58 |
| | MPCA | 2 | MPCA | 35 | MPCA | 23 | MPCA | 2 |
| | MXDA | 43 | BZA | 43 | BA | 43 | MXDA | 40 |
| | BA | 43 | | | | | BA | 43 |
| Use Level (PHR) with DGEBA | 41 | | 63 | | 71 | | 44 | |
| Mix Viscosity (mPa · s) | 440 | | 850 | | 460 | | 500 | |
| Coating Solids (weight %) | 91 | | 88 | | 88 | | 91 | |
| Thin Film Set Time (h) | | | | | | | | |
| Phase 2/Phase 3 | 3.3/3.5 | | 3.0/3.5 | | 3.0/3.9 | | 3.3/3.6 | |
| Coating Appearance | | | | | | | | |
| Specular Gloss 20°/60° | 1/23 | | 101/101 | | 100/99 | | 10/35 | |
| Visual | matte | | high gloss | | high gloss | | matte | |
| Persoz Hardness (s) | | | | | | | | |
| Day 1/Day 7 | 325/335 | | 295/305 | | 210/250 | | 310/320 | |
| Impact Resistance (kg · cm) Direct/Reverse | | | | | | | | |
| Schedule A | 75/<5 | | >200/75 | | >200/>200 | | 65/<5 | |
| Schedule B | 170/25 | | >200/>200 | | >200/>200 | | 105/10 | |
| Schedule C | | | | | | | | |
| Mandrel Bend (% elongat.) | | | | | | | | |
| Schedule A | — | | 8.1 | | 29 | | — | |
| Conical Bend (% elongat.) | | | | | | | | |
| Schedule A | — | | >33 | | >33 | | — | |

| Example | 20 | | 21 | | 22 | | 23 | |
|---|---|---|---|---|---|---|---|---|
| Hardener Composition (Parts by Weight) | DSD-4 | 75 | DSD-4 | 75 | MXDA | 100 | MPCA | 100 |
| | IPDA | 25 | PACM | 25 | BA | 43 | BA | 43 |
| | BA | 43 | BA | 43 | | | | |
| Use Level (PHR) with DGEBA | 63 | | 69 | | 26 | | 42 | |
| Mix Viscosity (mPa · s) | | | | | 875 | | 14,600 | |
| Coating Solids (weight %) | 88 | | 88 | | 94 | | 91 | |
| Thin Film Set Time (h) | | | | | | | | |
| Phase 2/Phase 3 | —/— | | —/— | | 3.3/3.7 | | 5.8/7.1 | |

TABLE 4-continued

Examples 12-23 cured at 25° C. or following cure schedules A-C.

Coating Appearance

| | | | | |
|---|---|---|---|---|
| Specular Gloss 20°/60° | —/— | —/— | 40/68 | 103/103 |
| Visual | glossy | glossy | mild carbamate | high gloss |

Persoz Hardness (s)

| | | | | |
|---|---|---|---|---|
| Day 1/Day 7 | 215/220 | 225/230 | 350/360 | 255/340 |

Impact Resistance (kg · cm) Direct/Reverse

| | | | | |
|---|---|---|---|---|
| Schedule A | —/— | —/— | 45/<5 | 40/<5 |
| Schedule B | —/— | —/— | 80/40 | 90/60 |
| Schedule C | —/— | —/— | 60/<5 | |

Mandrel Bend (% elongat.)

| | | | | |
|---|---|---|---|---|
| Schedule A | 5.2 | 4.1 | — | — |

Conical Bend (% elongat.)

| | | | | |
|---|---|---|---|---|
| Schedule A | 6.3 | <2 | — | — |

TABLE 5

Examples 12-23 cured at 5° C.

| Example | 12 | 13 | 14 | 15 |
|---|---|---|---|---|
| Thin Film Set Time (h) | | | | |
| Phase 2/Phase 3 | 10.2/12.6 | 10.9/14.3 | 8.4/11.2 | 8.0/10.5 |
| Coating Appearance | | | | |
| Specular Gloss 20°/60° | 15/55 | 15/55 | 78/91 | 50/74 |
| Visual | tacky | tacky | glossy | carbamate free |
| Persoz Hardness (s) | | | | |
| Day 2/Day 7 | —/— | —/— | 85/155 | 55/110 |

| Example | 16 | 17 | 18 | 19 |
|---|---|---|---|---|
| Thin Film Set Time (h) | | | | |
| Phase 2/Phase 3 | 8.5/10.2 | 8.5/12.4 | 8.0/10.7 | 9.0/13.6 |
| Coating Appearance | | | | |
| Specular Gloss 20°/60° | 1/15 | 52/86 | 80/91 | 7/30 |
| Visual | matte finish | mild carbamate | glossy | carbamate, matte finish |
| Persoz Hardness (s) | | | | |
| Day 2/Day 7 | 140/220 | 45/135 | 25/55 | 80/240 |

| Example | 20 | 21 | 22 | 23 |
|---|---|---|---|---|
| Thin Film Set Time (h) | | | | |
| Phase 2/Phase 3 | 10.4/13.2 | 11.4/15.6 | 9.2/9.8 | 18.1/21.4 |
| Coating Appearance | | | | |
| Specular Gloss 20°/60° | —/— | —/— | 11/40 | 98/100 |
| Visual | —/— | —/— | carbamated | high gloss |
| Persoz Hardness (s) | | | | |
| Day 2/Day 7 | 15/85 | 15/110 | 190/275 | 11/140 |

Examples 24-25

Coatings Made from Amine-Epoxy Compositions Wherein the Amine Component Comprises a Multifunctional Amine Derivative Tables 6-7 list the formulations and the resulting properties of inventive examples 24-25, at 25° C. and 5° C., respectively. Examples 24-25 illustrate the properties obtained from exemplary formulations and coatings obtained from compositions comprising N,N'-dimethyl secondary diamines with multifunctional amine derivatives in accordance with the present invention. Comparative examples 10-11 in Tables 2-3 illustrate coating properties using multifunctional amine derivatives absent N,N'-dimethyl secondary diamines.

In comparison to Example 11 at 25° C., the coating of Example 24 exhibited significantly improved impact resistance and flexibility (mandrel and conical bend). At 5° C., Example 24 had much faster cure speed as measured by thin film set time and the thumb twist method, as well as faster hardness development.

In comparison to Example 10 at 25° C., the coating of Example 25 exhibited significantly improved impact resistance and flexibility (mandrel and conical bend). At 5° C., Example 25 had much faster cure speed as measured by thin film set time and the thumb twist method, as well as faster hardness development. Further, Example 25 had higher gloss and improved waterspot resistance at 5° C. as compared to Example 10.

TABLE 6

Inventive Examples 24-25 cured at 25° C.

| Example | 24 | | 25 | |
|---|---|---|---|---|
| Hardener Composition (Parts by Weight) | DSD-4 | 50 g | DSD-4 | 50 g |
|  | A 350A | 50 g | CX-105 | 50 g |
|  | BA | 22 g | BA | 22 g |
| Use Level (PHR) | 63 | | 80 | |
| Mix Viscosity (mPa · s) | 2,050 | | 3,700 | |
| Coating Solids (weight %) | | | | |
| At mix viscosity | 93 | | 92 | |
| Diluted to 1 Pa · s $^a$ | 91 | | 91 | |
| Coating Appearance | | | | |
| Visual | greasy surface | | Glossy | |
| Persoz Hardness (s) | | | | |
| Day 1/Day 7 | —/— | | 245/265 | |
| Impact Resistance (kg · cm) Direct/Reverse | | | | |
| Schedule A | 170/85 | | 200/65 | |
| Mandrel Bend (% elongat.) | | | | |
| Schedule A | 33 | | 33 | |
| Conical Bend (% elongat.) | | | | |
| Schedule A | >33 | | >33 | |

$^a$ adjusted with xylene:butanol (3:1) to match comparable application viscosity

TABLE 7

Inventive Examples 24-25 cured at 5° C.

| Example | 24 | 25 |
|---|---|---|
| Thin Film Set Time (h) | | |
| Phase 2/Phase 3 | 15.2/17.6 | 6.4/11.0 |

TABLE 7-continued

Inventive Examples 24-25 cured at 5° C.

| Example | 24 | 25 |
|---|---|---|
| Thumb Twist method | | |
| Set-to-Touch Time (h) | 16 | 9 |
| Dry-to-Handle Time (h) | 19 | 10 |
| Coating Appearance | | |
| Specular Gloss 20°/60° | — | 86/95 |
| Visual | tacky | Glossy |
| Waterspot Resistance | | |
| Day 1/Day 7 (1-5, 5 = best) | 2/2 | 4/4 |
| Persoz Hardness (s) | | |
| Day 2/Day 7 | —/130 | 95/210 |

Examples 26-29

Impact of the Stoichiometric Ratio of Epoxy Groups to Amine Hydrogens on Coating Properties Table 8 lists the formulations and the resulting properties of inventive examples 26-29. Examples 26-29 illustrate the effect of changing the stoichiometric ratio of epoxy groups in the epoxy component to amine hydrogens in the amine component. The amine component consisted of a mixture of 75 parts by weight of DSD-2, 25 parts MPCA, and 43 parts benzyl alcohol. As indicated in Table 8, increasing the ratio of epoxy groups relative to amine hydrogens increased the dry time as measured by thin film set time, but yielded increased hardness and improved appearance as measured by gloss.

TABLE 8

Inventive Examples 26-29.

| Example | 26 | 27 | 28 | 29 |
|---|---|---|---|---|
| Stoichiometry | | | | |
| Epoxy:Amine Groups | 1:0.7 | 1:0.8 | 1:0.9 | 1:1.0 |
| Use Level (PHR) | 44 | 50 | 56 | 62 |
| Thin Film Set Time at 5° C. (h) | | | | |
| Phase 2 | 9.9 | 8.9 | 8.0 | 8.0 |
| Appearance | | | | |
| Specular Gloss 20°/60° at 5° C. | 60/85 | 50/73 | 45/65 | 38/60 |
| Persoz Hardness (s) | | | | |
| Day 1/Day 7 at 5° C. | 40/185 | 55/185 | 50/175 | 50/125 |
| Day 1 at 25° C. | 320 | 290 | 275 | 205 |

Comparative Examples 30-34

Coatings Made from Comparative Epoxy-Hardener Compositions

Formulations and the resulting properties of comparative examples 30-34 are illustrated in Tables 9-10. As indicated in the tables, the coating of Example 30 exhibited fast dry speed but demonstrated poor appearance at 10° C. The coating was relatively brittle as illustrated by the mechanical properties and high early hardness values. In addition, coatings based on Example 30 showed good adhesion strength to dry and wet concrete. The coatings of Examples 31-32 exhibited slow dry speeds and slow hardness development at both 23° C. and at 10° C. Example 31 used IPDA, a multifunctional amine. Example 32 used an amine adduct derivative of a cycloaliphatic amine. The introduction of K54 in Example 33, as compared to Example 32, accelerated the dry speed and hardness development at 10° C. and 23° C. and improved the appearance at 10° C. Coatings based on Examples 31-33 showed comparable mechanical properties to Example 30. The coating of Example 34 exhibited good flexibility as shown by tensile test results, but provided poor Shore hardness development and required a very high curing agent loading (use level in PHR).

TABLE 9

Comparative examples 30-34 cured at 23° C.

| Example | 30 | 31 | 32 | 33 | 34 |
|---|---|---|---|---|---|
| Comparative Hardener (Parts by Weight) | A2609 | IPDA 57 BA 43 | A1618 | A1618 95 K54 5 | A2390 |
| Use Level (PHR) | 40 | 40 | 60 | 60 | 105 |
| Hardener Viscosity (mPa · s) | 450 | 50 | 520 | 515 | 1,200 |
| Mix Viscosity (mPa · s) | 1,750 | — | 2,300 | 2,250 | 1,900 |
| Gel-time (min) | 14 | 42 | 50 | 40 | 18 |
| Thin Film Set Time (h) | | | | | |
| Phase 2/Phase 3 | 1.5/2.0 | 5.6/7.2 | 4.9/6.0 | 4.0/4.9 | —/4.0 |
| Coating Appearance | | | | | |
| Visual | high gloss | high gloss | high gloss | high gloss | high gloss |
| Persoz Hardness (s) | | | | | |
| 8 h | 140 | 35 | 30 | 85 | — |
| 16 h | — | 230 | 215 | 215 | — |
| 24 h | 310 | 265 | 250 | 265 | — |
| Shore A/D Hardness | | | | | |
| 8 h | >80D | 50A | 40A | 43D | too soft |
| 16 h | — | 75D | 71D | 77D | too soft |
| 24 h | — | 77D | 74D | 78D | too soft |
| Mechanical Compressive | | | | | |
| Compressive Strength (MPa) | 120 | 96 | 80 | 90 | — |
| Compressive Modulus (GPa) | 2.2 | 2.1 | 1.6 | 2.0 | — |
| Mechanical Tensile | | | | | |
| Tensile Strength (MPa) | 46 | — | 51 | — | 22 |
| Tensile Modulus (GPa) | 7.6 | — | 6.1 | — | 0.8 |
| Elongation at Break (%) | 0.7 | — | 0.8 | — | 54 |
| Dry Concrete Adhesion | | | | | |
| Pull-Off Adhesion (MPa) | 10.7 | — | — | 10.4 | — |
| Mode of Failure | 100% A | — | — | 100% A | — |
| Wet Concrete Adhesion | | | | | |
| Pull-Off Adhesion (MPa) | 4.2 | — | — | 6.5 | — |
| Mode of Failure | 50% A 50% A/B | — | — | 100% A | — |

TABLE 10

Comparative examples 30-34 cured at 10° C.

| Example | 30 | 31 | 32 | 33 | 34 |
|---|---|---|---|---|---|
| Thin Film Set Time (h) | | | | | |
| Phase 2/Phase 3 | 3.5/4.1 | 14.3/19.0 | 11.5/15.7 | 10.2/13.0 | —/— |
| Coating Appearance | | | | | |
| Visual | carbamated | semi gloss | semi gloss | high gloss | — |
| Persoz Hardness (s) | | | | | |
| 8 h | — | 20 | 20 | 25 | — |
| 16 h | — | 45 | 35 | 60 | — |
| 24 h | — | 120 | 105 | 140 | — |
| Shore A/D Hardness | | | | | |
| 8 h | — | 30A | 20A | 60A | — |
| 16 h | — | 70A | 65A | 55D | — |
| 24 h | — | 65D | 60D | 68D | — |

Inventive Examples 35-38

Coatings Made from Amine-Epoxy Compositions

Formulations and the resulting properties of inventive examples 35-38 are shown in Tables 11-12. Examples 35-38 illustrate the properties obtained from exemplary formulations and coatings utilizing compositions comprising N,N'-dimethyl secondary diamines with multifunctional amines in accordance with the present invention.

As indicated in the tables, Examples 35-38 utilized compositions comprising DSD-4 (a methylamine-terminated poly-(N-methylazetidine)polymeric compound) with at least one multifunctional amine, either IPDA or A1618. Since A1618 as supplied includes benzyl alcohol, the benzyl alcohol content in the curing agent in Examples 36-38 was substantially equal to that of Examples 31-33. In comparison to Example 31-32, the coatings of Examples 35-37 exhibited faster drying speeds and more rapid hardness development at both 23° C. and 10° C. Additionally, coatings based on Example 35 provided longer gel time and lower neat curing agent viscosity, and hence lower anticipated mix viscosity than Example 30. Furthermore, coatings based on Example 35 provided better pull-off adhesion strength to concrete, particularly to wet concrete.

In comparison to Example 34, the coating based on Example 38 exhibited significantly higher flexibility as illustrated by tensile elongation at break while offering lower curing agent viscosity for better product handling. In comparison to Examples 32-33, Example 38 exhibited significantly faster drying speeds at both 23° C. and 10° C. In part, this is exemplified by comparing the thin film set time at both temperatures and the gel-time at 23° C. In addition, when compared to Example 30, the coating based on Example 38 provided higher pull-off adhesion strength to concrete, particularly to wet concrete.

TABLE 11

Inventive examples 35-38 cured at 23° C.

| Example | 35 | | 36 | | 37 | | 38 | |
| --- | --- | --- | --- | --- | --- | --- | --- | --- |
| Hardener Composition | DSD-4 | 30 | DSD-4 | 18 | DSD-4 | 37 | DSD-4 | 37 |
| (Parts by Weight) | IPDA | 34 | IPDA | 38 | IPDA | 20 | A1618 | 35 |
|  | BA | 36 | BA | 43 | BA | 43 | BA | 28 |
| Use Level (PHR) | 50 | | 50 | | 68 | | 86 | |
| Hardener Viscosity (mPa · s) | 46 | | 49 | | 48 | | 80 | |
| Mix Viscosity (mPa · s) | | | | | | | | |
| Gel-time (min) | 27 | | 31 | | 21 | | 20 | |
| Thin Film Set Time (h) | | | | | | | | |
| Phase 2/Phase 3 | 3.7/4.6 | | 4.3/5.6 | | 3.4/4.4 | | 2.9/4.4 | |
| Coating Appearance | | | | | | | | |
| Visual | glossy | | Glossy | | glossy | | glossy | |
| Persoz Hardness (s) | | | | | | | | |
| 8 h | 145 | | 95 | | 80 | | 60 | |
| 16 h | 300 | | 285 | | 215 | | 125 | |
| 24 h | 300 | | 295 | | 230 | | 130 | |
| Shore A/D Hardness | | | | | | | | |
| 8 h | 52D | | 42D | | 32D | | 68A | |
| 16 h | 80D | | 79D | | 75D | | 67D | |
| 24 h | 80D | | 79D | | 77D | | 68D | |
| Mechanical Compressive | | | | | | | | |
| Compressive Strength (MPa) | 84 | | 87 | | 25 | | 4 | |
| Compressive Modulus (GPa) | 1.7 | | 1.8 | | 0.4 | | <0.1 | |
| Mechanical Tensile | | | | | | | | |
| Tensile Strength (MPa) | | | | | | | | 16 |
| Tensile Modulus (GPa) | | | | | | | | 0.8 |
| Elongation at Break (%) | | | | | | | | 80 |
| Dry Concrete Adhesion | | | | | | | | |
| Pull-Off Adhesion (MPa) | 11.5 | | | | | | 10.6 | |
| Mode of Failure | 100% A | | | | | | 100% A | |
| Wet Concrete Adhesion | | | | | | | | |
| Pull-Off Adhesion (MPa) | 6.7 | | | | | | 5.7 | |
| Mode of Failure | 100% A | | | | | | 100% A | |

TABLE 12

| Inventive examples 35-38 cured at 10° C. | | | | |
|---|---|---|---|---|
| Example | 35 | 36 | 37 | 38 |
| Thin Film Set Time (h) | | | | |
| Phase 2/Phase 3 | 8.9/11.8 | 10.7/13.8 | 8.5/11.5 | 7.9/9.2 |
| Coating Appearance | | | | |
| Visual | semi gloss | semi gloss | semi gloss | semi gloss |
| Persoz Hardness (s) | | | | |
| 8 h | 50 | 40 | 30 | 20 |
| 16 h | 105 | 90 | 70 | 30 |
| 24 h | 210 | 200 | 115 | 75 |
| Shore A/D Hardness | | | | |
| 8 h | 75A | 75A | 55A | 45A |
| 16 h | 67D | 65D | 55D | 85A |
| 24 h | 78D | 75D | 75D | 58D |

The invention claimed is:

1. N,N'-dimethyl secondary diamine polymer having a number-average molecular weight ($M_n$) from about 180 to about 500 and comprising a polymer having the formula:

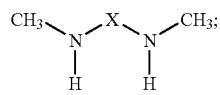

wherein X is a moiety having the formula:

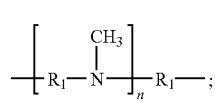

wherein:
$R_1$ is a $C_3$-$C_8$ linear or branched alkanediyl; and
n comprises integers ranging from greater than 1 through 50, the average of which is determined as a function of $M_n$; wherein the polymer comprises methylamine-terminated poly-(N-methylazetidine).

2. An amine curing agent composition comprising:
(i) 90% to 10% by weight, based on total amine curing agent composition, of at least one N,N'-dimethyl secondary diamine polymer selected from a methylamine-terminated polyoxypropylene polymer, a methylamine-terminated polyoxypropylene polyoxyethylene copolymer, or a polymer having the formula:

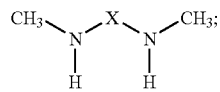

wherein X is a moiety having the formula:

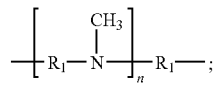

wherein:
$R_1$ is a $C_2$-$C_8$ linear or branched alkanediyl;
the at least one N,N'-dimethyl secondary diamine has a number-average molecular weight ($M_n$) from about 180 to about 1000;
n comprises integers ranging from greater than 1 through 50, the average of which is determined as a function of $M_n$; and
(ii) 10% to 90% by weight, based on total amine curing agent composition, of at least one multifunctional amine having 3 or more active amine hydrogens.

3. The composition of claim 2 further comprising an epoxy component comprising at least one multifunctional epoxy resin.

4. An amine curing agent composition comprising:
(i) 90% to 10% by weight, based on total amine curing agent composition, of at least one N,N'-dimethyl secondary diamine polymer having a number-average molecular weight ($M_n$) from about 180 to about 300; and
(ii) 10% to 90% by weight, based on total amine curing agent composition, of at least one multifunctional amine having 3 or more active amine hydrogens.

5. An amine curing agent composition comprising:
(i) about 80% to about 20% by weight, based on total amine curing agent composition, of at least one N,N'-dimethyl secondary diamine selected from methylamine-terminated poly-(N-methylazetidine), methylamine-terminated poly-(N-methylazacycloheptane), or a combination thereof; and
(ii) about 20% to about 80% by weight, based on total amine curing agent composition, of at least one multifunctional amine having 6 or more carbon atoms and 3 or more active amine hydrogens.

6. The composition of claim 3 wherein the composition is curable at a temperature of less than or equal to about 5° C. and has a Persoz Hardness at Day 7 of 55.

7. The composition of claim 2 wherein the epoxy and amine are present at a stoichiometric ratio of epoxy groups in the multifunctional epoxy resin to amine hydrogens in the amine component ranging from about 1.5:1 to about 1:1.5.

8. The polymer of claim 1 wherein the polymer is made by a method which comprises
adding one of an appropriate nitrile and monomethylamine to the other in a reactor by delayed addition mode in a nitrile at a temperature of 40 to −80° C. to monomethylamine molar ratio of 0.6:1 to 2.2:1 to form an intermediate nitrile by the Michael addition reaction, and
continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38 to 20.7 MPa and at a temperature of 70 to 150° C.

9. The polymer of claim 8 wherein the nitrile is acrylonitrile.

10. The polymer of claim 8 wherein the nitrile is adiponitrile.

11. The N,N'-dimethyl secondary diamine polymer of claim 1 made by adding one of an appropriate nitrile and monomethylamine to the other in a reactor by delayed addition mode at 40 to 80° C. in a nitrile to monomethylamine molar ratio of 0.6:1 to 2.2:1 to form an intermediate nitrile by the Michael addition reaction, and continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) a temperature from 70 to 150° C. and a hydrogenation catalyst at 0.75 to 5 wt % of the total intermediate nitrile feed.

12. The diamine polymer of claim 11 wherein the N,N'-dimethyl secondary diamine polymer is methylamine-terminated poly-(N-methyl-azetidine) and the nitrile is acrylonitrile.

13. The diamine polymer of claim 11 wherein the N,N'-dimethyl secondary diamine polymer is methylamine-terminated poly-(N-methyl-azacycloheptane) and the nitrile is adipodinitrile.

14. N,N'-dimethyl secondary diamine polymer having a number-average molecular weight ($M_n$) from about 160 to about 500 and comprising a polymer having the formula:

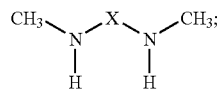

wherein X is a moiety having the formula:

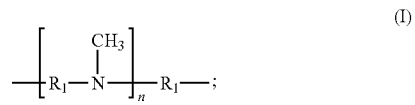

wherein:
R$_1$ is a C$_2$-C$_8$ linear or branched alkanediyl; and
n comprises integers, the average of which is determined as a function of $M_n$;
wherein the polymer is made by adding one of an appropriate nitrile and monomethylamine to the other in a reactor by delayed addition mode at 40 to 80° C. in a nitrile to monomethylamine molar ratio of 0.6:1 to 2.2:1 to form an intermediate nitrile by the Michael addition reaction, and
continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) a temperature from 70 to 150° C. and a hydrogenation catalyst at 0.75 to 5 wt % of the total intermediate nitrile feed, and
wherein the N,N'-dimethyl secondary diamine polymer is methylamine-terminated poly-(N-methyl-azacycloheptane) and the nitrile is adipodinitrile.

15. The polymer of claim 1 wherein $M_n$ is from about 180 to about 300.

16. The polymer of claim 4 wherein the polymer comprises methylamine-terminated poly-(N-methylazetidine).

17. The composition of claim 5 wherein the amine comprises methylamine-terminated poly-(N-methylazetidine).

18. N,N'-dimethyl secondary diamine polymer having a number-average molecular weight ($M_n$) from about 160 to about 500 and comprising a polymer having the formula:

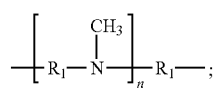

wherein X is a moiety having the formula:

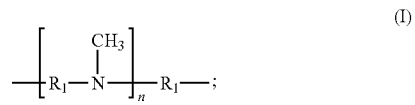

wherein:
R$_1$ is a C$_2$-C$_8$ linear or branched alkanediyl; and n comprises integers ranging from 1 through 50, the average of which is determined as a function of $M_n$; wherein the N,N'-dimethyl secondary diamine polymer is made by adding one of an appropriate nitrile and monomethylamine to the other in a reactor by delayed addition mode at 40 to 80° C. in a nitrile to monomethylamine molar ratio of 0.6:1 to 2.2:1 to form an intermediate nitrile by the Michael addition reaction, and continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) a temperature from 70 to 150° C. and a hydrogenation catalyst at 0.75 to 5 wt % of the total intermediate nitrile feed and wherein the N,N'-dimethyl secondary diamine polymer is methylamine-terminated poly-(N-methyl-azacycloheptane) and the nitrile is adipodinitrile.

19. The composition of claim 3 wherein the composition is curable at a temperature of less than or equal to about 5° C. and has a Persoz Hardness at Day 7 of 275.

20. N,N'-dimethyl secondary diamine polymer having a number-average molecular weight ($M_n$) from about 180 to about 500 and comprising a polymer having the formula:

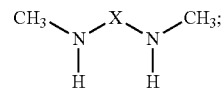

wherein X is a moiety having the formula:

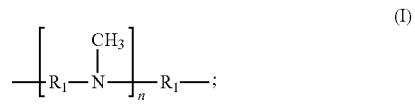

wherein:
R$_1$ is a C$_3$-C$_8$ linear or branched alkanediyl; and
n comprises integers ranging from greater than 1 through 50, the average of which is determined as a function of $M_n$;
wherein the N,N'-dimethyl secondary diamine polymer of is made by adding one of an appropriate nitrile and monomethylamine to the other in a reactor by delayed addition mode at 40 to 80° C. in a nitrile to monomethylamine molar ratio of 0.6:1 to 2.2:1 to form an intermediate nitrile by the Michael addition reaction, and continuously adding the intermediate nitrile to a liquid phase containing monomethylamine in a 0.1 to 0.75 wt ratio of monomethylamine to total intermediate nitrile feed, in the presence of hydrogen at a hydrogen pressure of 1.38-20.7 MPa (200-3000 psig) at a temperature from 70 to 150° C. and a hydrogenation catalyst at 0.75 to 5 wt % of the total intermediate nitrile feed; and wherein the N,N'-dimethyl secondary diamine polymer comprises methylamine-terminated poly-(N-methyl-azetidine) and the nitrile comprises acrylonitrile.

21. N,N'-dimethyl secondary diamine polymer having a number-average molecular weight ($M_a$) from about 180 to about 500 and comprising a polymer having the formula:

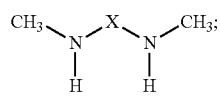

wherein X is a moiety having the formula:

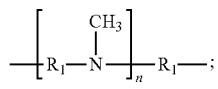
(I)

wherein:

$R_1$ is a $C_3$-$C_8$ linear or branched alkanediyl; and n comprises integers ranging from greater than 1 through 50, the average of which is determined as a function of $M_n$;

wherein the N,N'-dimethyl secondary diamine polymer is made by adding one of an appropriate nitrile and monomethylamine to the other in a reactor by delayed addition mode at 40 to 80° C. in a nitrile to monomethylamine molar ratio of 0.6:1 to 2.2:1 to form an intermediate nitrile by the Michael addition reaction, and continuously adding the intermediate nitrile to a liquid phase containing monomethylamine in 0.1 to 0.75 wt ratio of monomethylamine to total intermediate nitrile feed, in the presence of hydrogen at a hydrogen pressure of 1.38 to 20.7 MPa at a temperature from 70 to 150° C. and a hydrogenation catalyst at 0.75 to 5 wt % of the total intermediate nitrile feed; and wherein the N,N'-dimethyl secondary diamine polymer comprises methylamine-terminated poly-(N-methyl-azacycloheptane) and the nitrile comprises adipodinitrile.

* * * * *